United States Patent
Iftime et al.

(10) Patent No.: US 7,282,245 B2
(45) Date of Patent: Oct. 16, 2007

(54) DEVICE WITH MULTIPLE LIQUID CRYSTAL LAYERS

(75) Inventors: Gabriel Iftime, Mississauga (CA); Hadi K. Mahabadi, Mississauga (CA); Peter M. Kazmaier, Mississauga (CA)

(73) Assignee: Xerox Corporation, Stamford, CT (US)

( * ) Notice: Subject to any disclaimer, the term of this patent is extended or adjusted under 35 U.S.C. 154(b) by 438 days.

(21) Appl. No.: 10/973,139

(22) Filed: Oct. 26, 2004

(65) Prior Publication Data

US 2006/0088667 A1    Apr. 27, 2006

(51) Int. Cl.
C09K 19/52 (2006.01)
C09K 19/54 (2006.01)
G02F 1/1347 (2006.01)

(52) U.S. Cl. ............ 428/1.1; 428/1.3; 252/299.01; 252/299.5; 349/78; 349/81

(58) Field of Classification Search ......... 252/299.01, 252/299.5, 299.7; 428/1.1, 1.3; 349/78, 349/81

See application file for complete search history.

(56) References Cited

U.S. PATENT DOCUMENTS

| | | | |
|---|---|---|---|
| 5,625,477 A | 4/1997 | Wu et al. ............... 349/35 |
| 5,661,533 A | 8/1997 | Wu et al. ............... 349/169 |
| 5,691,795 A | 11/1997 | Doane et al. ........... 349/169 |
| 5,847,798 A | 12/1998 | Yang et al. ............. 349/169 |
| 6,061,107 A | 5/2000 | Yang et al. ............. 349/86 |
| 6,103,431 A | 8/2000 | Tamaoki et al. ........ 430/20 |
| 6,377,321 B1 | 4/2002 | Khan et al. ............. 349/35 |
| 6,654,080 B1 | 11/2003 | Khan et al. ............. 349/73 |
| 6,767,480 B2* | 7/2004 | Iftime et al. ........... 252/299.01 |
| 6,824,708 B2* | 11/2004 | Iftime et al. ........... 252/299.01 |
| 6,849,204 B2* | 2/2005 | Iftime et al. ........... 252/299.01 |
| 6,858,266 B2* | 2/2005 | Iftime et al. ........... 428/1.1 |
| 6,905,633 B2* | 6/2005 | Iftime et al. ........... 252/299.01 |
| 6,939,478 B2* | 9/2005 | Iftime et al. ........... 252/299.01 |
| 6,994,801 B2* | 2/2006 | Iftime et al. ........... 252/299.01 |
| 2004/0115366 A1 | 6/2004 | Iftime et al. ........... 428/1.1 |

OTHER PUBLICATIONS

Davis et al., "31.2: Eight-Color High-Resolution Reflective Cholesteric LCDs", *SID* (1998).
Okada et al., 42.3: Reflective Multicolor Display Using Cholesteric Liquid Crystals, *SID 97 DIGEST* (1997).

(Continued)

*Primary Examiner*—Shean C. Wu
(74) *Attorney, Agent, or Firm*—Zosan Soong

(57) ABSTRACT

A device composed of: (a) a first liquid crystal composition including a first liquid crystal and a first liquid crystal domain stabilizing compound, wherein the first liquid crystal composition switches between a strongly scattering state of a first plurality of smaller liquid crystal domains that strongly scatters a predetermined light and a weakly scattering state of a second plurality of larger liquid crystal domains that weakly scatters the predetermined light; and (b) a second liquid crystal composition including a second liquid crystal and a second liquid crystal domain stabilizing compound, wherein the second liquid crystal composition switches between a strongly scattering state of a first plurality of smaller liquid crystal domains that strongly scatters the predetermined light and a weakly scattering state of a second plurality of larger liquid crystal domains that weakly scatters the predetermined light, wherein the second liquid crystal composition and the first liquid crystal composition are in a stacked arrangement.

23 Claims, 4 Drawing Sheets

OTHER PUBLICATIONS

D.K. Yang et al., "Polymer-stabilized Cholesteric Textures," *Liquid Crystals in Complex Geometries Formed by polymer and porous networks*, pp. 103-142 (Published by Taylor & Francis Ltd. 1996).

H. Yuan, "Bistable Reflective Cholesteric Displays," *Liquid Crystals in Complex Geometries Formed by polymer and porous networks*, pp. 265-280 (Published by Taylor & Francis Ltd. 1996).

J. Kim et al., "White Reflective Displays from Polymer-Stabilized Cholesteric Textures," SID, p. 802-805 (1998).

D.-K. Yang et al., "Cholesteric liquid crystal/polymer dispersion for haze-free light shutters," *Appl. Phys. Lett.*, vol. 60, pp. 3102-3104 (Jun. 1992).

J. Nie et al., "Photocuring of mono- and di-functional (meth)acrylates with tris [2-acryloyloxy)ethyl]isocyanurate," *European Polymer Journal*, vol. 35, pp. 1491-1500 (1999).

W.D. Cook, "Photopolymerization kinetics of dimethacrylates using the camphorquinone/amine initiator system," *Polymer*, vol. 33, pp. 600-609 (1992).

I. Dierking, "Polymer Network-Stabilized Liquid Crystals," *Adv. Mater.*, vol. 12, pp. 167-181 (2000).

D.-K. Yang et al., "Control of reflectivity and bistability in displays using cholesteric liquid crystals," *J. Appl. Phys.*, vol. 76, pp. 1331-1333 (1994).

E. Korenic et al., "Cholesteric Liquid Crystal Flakes—A New Form of Domain," *LLE Review*, vol. 74, pp. 139-149 (1998).

N. Tamaoki et al., "Rewritable Full-Color Recording in a Photon Mode," *Adv. Mater.*, vol. 12, pp. 94-97 (2000).

W. Schuddeboom et al., "Excited-State Dipole Moments of Dual Fluorescent 4-(Dialkylamino)benzonitriles. Influence of Alkyl Chain Length and Effective Solvent Polarity," *J. Phys. Chem.*, vol. 96, pp. 10809-10819 (1992).

\* cited by examiner

DEVICE WITH MULTIPLE LIQUID CRYSTAL LAYERS

CROSS-REFERENCE TO RELATED APPLICATIONS

Gabriel Iftime et al., US Patent Application Publication 2004/0115366A1, corresponding to U.S. application Ser. No. 10/319,870, filed Dec. 13, 2002, titled "DOMAIN SIZE CONTROLLED LIQUID CRYSTALS."

BACKGROUND OF THE INVENTION

Liquid crystal displays continue to be a dominant technology for flat panel displays. Liquid crystal displays that do not use polarizers, are reflective, and have intrinsic display memory are desirable in many situations. A number of reflective cholesteric liquid crystal displays has recently been developed. But these conventional reflective cholesteric liquid crystal displays typically suffer from one or more of the following deficiencies: switching between two states (e.g., planar state and focal-conic state) where one or both states are not stable under zero electric field; difficulty in fabricating black and white displays since one of the states must be colored (i.e., a color other than white or black); viewing angle dependency; poor light reflectivity; and poor contrast between the two states. There is a need, addressed by the present invention, to minimize or avoid one or more of above described problems.

The following documents provide background information:

Davis et al., "31.2: Eight-Color High-Resolution Reflective Cholesteric LCDs", SID (1998).

Khan et al., U.S. Pat. No. 6,654,080 B1.

Khan et al., U.S. Pat. No. 6,377,321 B1.

Okada et al., "42.3: Reflective Multicolor Display Using Cholesteric Liquid Crystals, SID 97 DIGEST (1997).

Yang et al., U.S. Pat. No. 6,061,107.

Tamaoki et al., U.S. Pat. No. 6,103,431.

Yang et al., U.S. Pat. No. 5,847,798.

Doane et al., U.S. Pat. No. 5,691,795.

Wu et al., U.S. Pat. No. 5,625,477.

Wu et al., U.S. Pat. No. 5,661,533.

D. K. Yang et al., "Polymer-stabilized Cholesteric Textures," Liquid Crystals in Complex Geometries Formed by polymer and porous networks, pp. 103-142 (Published by Taylor & Francis Ltd. 1996).

H. Yuan, "Bistable Reflective Cholesteric Displays," Liquid Crystals in Complex Geometries Formed by polymer and porous networks, pp. 265-280 (Published by Taylor & Francis Ltd. 1996).

J. Kim et al., "White Reflective Displays from Polymer-Stabilized Cholesteric Textures," SID, p. 802-805 (1998).

D.-K. Yang et al., "Cholesteric liquid crystal/polymer dispersion for haze-free light shutters," Appl. Phys. Lett., Vol. 60, pp. 3102-3104 (June 1992).

J. Nie et al., "Photocuring of mono- and di-functional (meth)acrylates with tris [2-(acryloyloxy)ethyl]isocyanurate," European Polymer Journal, Vol. 35, pp. 1491-1500 (1999).

W. D. Cook, "Photopolymerization kinetics of dimethacrylates using the camphorquinone/amine initiator system," Polymer, Vol. 33, pp. 600-609 (1992).

I. Dierking, "Polymer Network-Stabilized Liquid Crystals," Adv. Mater., Vol. 12, pp. 167-181 (2000).

D.-K. Yang et al., "Control of reflectivity and bistability in displays using cholesteric liquid crystals," J. Appl. Phys., Vol. 76, pp. 1331-1333 (1994).

E. Korenic et al., "Cholesteric Liquid Crystal Flakes—A New Form of Domain," LLE Review, Vol. 74, pp. 139-149 (1998).

N. Tamaoki et al., "Rewritable Full-Color Recording in a Photon Mode," Adv. Mater., Vol. 12, pp. 94-97 (2000).

W. Schuddeboom et al., "Excited-State Dipole Moments of Dual Fluorescent 4-(Dialkylamino)benzonitriles. Influence of Alkyl Chain Length and Effective Solvent Polarity," J. Phys. Chem., Vol. 96, pp. 10809-10819 (1992). The compound of formula 1-I described in the present application is disclosed in Schuddeboom et al.

SUMMARY OF THE DISCLOSURE

There is disclosed in embodiments a device comprising:

(a) a first liquid crystal composition including a first liquid crystal and a first liquid crystal domain stabilizing compound, wherein the first liquid crystal composition switches between a strongly scattering state of a first plurality of smaller liquid crystal domains that strongly scatters a predetermined light and a weakly scattering state of a second plurality of larger liquid crystal domains that weakly scatters the predetermined light; and (b) a second liquid crystal composition including a second liquid crystal and a second liquid crystal domain stabilizing compound, wherein the second liquid crystal composition switches between a strongly scattering state of a first plurality of smaller liquid crystal domains that strongly scatters the predetermined light and a weakly scattering state of a second plurality of larger liquid crystal domains that weakly scatters the predetermined light, wherein the second liquid crystal composition and the first liquid crystal composition are in a stacked arrangement.

In further embodiments, there is disclosed a method comprising:

(a) providing a first liquid crystal composition including a first liquid crystal and a first liquid crystal domain stabilizing compound, wherein the first liquid crystal composition is switchable between a strongly scattering state of a first plurality of smaller liquid crystal domains that strongly scatters a predetermined light and a weakly scattering state of a second plurality of larger liquid crystal domains that weakly scatters the predetermined light;

(b) providing a second liquid crystal composition including a second liquid crystal and a second liquid crystal domain stabilizing compound, wherein the second liquid crystal composition is switchable between a strongly scattering state of a first plurality of smaller liquid crystal domains that strongly scatters the predetermined light and a weakly scattering state of a second plurality of larger liquid crystal domains that weakly scatters the predetermined light, wherein the second liquid crystal composition and the first liquid crystal composition are in a stacked arrangement; and (c) switching between the strongly scattering state and the weakly scattering state in the first liquid crystal composition and in the second liquid crystal composition.

BRIEF DESCRIPTION OF THE DRAWINGS

Other aspects of the present invention will become apparent as the following description proceeds and upon reference to the Figures which represent exemplary embodiments.

Unless otherwise noted, the same reference numeral in different Figures refers to the same or similar feature.

DETAILED DESCRIPTION

Figure 1:
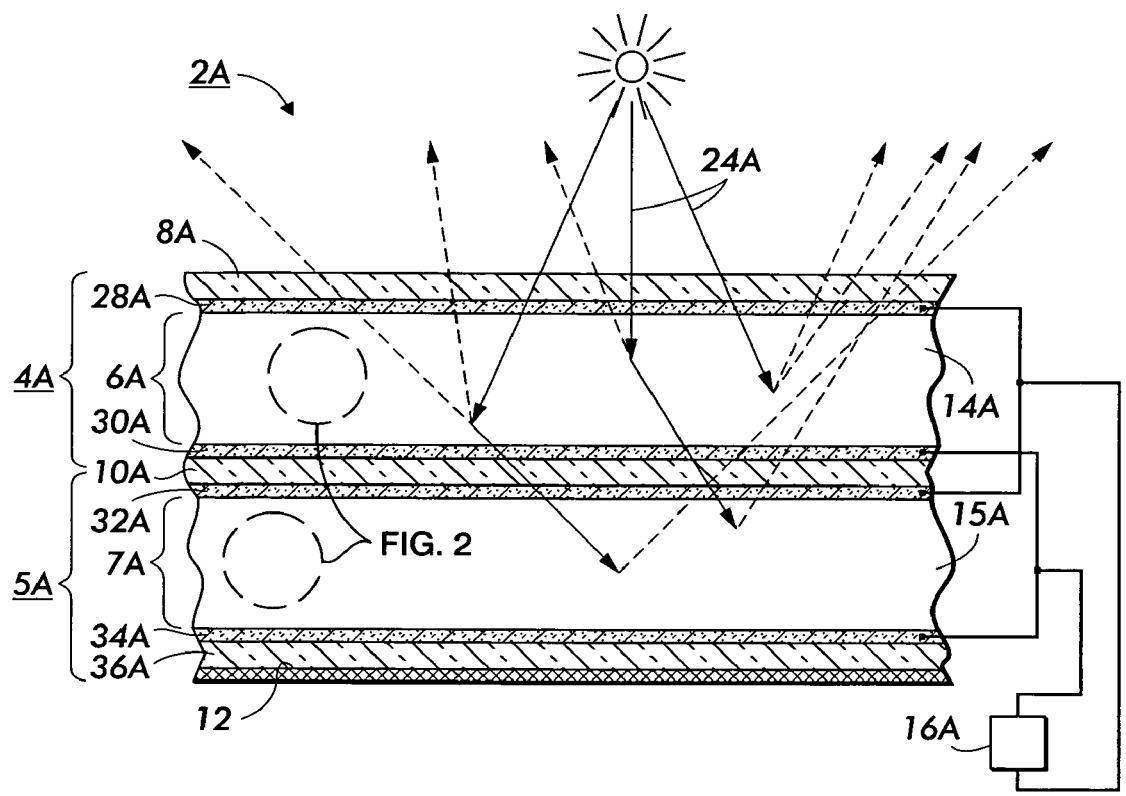
FIG. 1 depicts an elevational simplified view of a first embodiment of the present device where the device exhibits a strongly scattering state.

Unless otherwise noted the term "alkyl" encompasses both a straight chain alkyl and a branched alkyl.

The liquid crystal composition includes a liquid crystal and a liquid crystal domain stabilizing compound.

I. Liquid Crystals

The liquid crystal may be any liquid crystal capable of forming a plurality of liquid crystal domains. In embodiments, the liquid crystal may be for example a chiral nematic (i.e., cholesteric) liquid crystal or a nematic liquid crystal. The liquid crystal may be a single compound or a mixture of two or more different compounds.

A. Nematic Liquid Crystals

Nematic liquid crystals with positive dielectric anisotropy are composed of a hard core made of a polyaromatic ring and a flexible moiety composed of a hydrocarbon group. In embodiments, the nematic liquid crystals suitable for the purposes of this invention are composed of a hard core made of two or more monocyclic aromatic groups and a flexible moiety made of an alkyl group of variable length, which may be optionally substituted. Most often, commercially available nematic liquid crystals are mixtures of nematic molecules.

Many suitable nematic liquid crystals are mixtures of alkyl-biphenylnitrile or alkyl-terphenylnitrile molecules and are commercially available and would be known to those of ordinary skill in the art in view of this disclosure. Exemplary examples include for example nematic liquid crystal BL mixtures available at EM Industries, Inc., BL001 (E7), BL002 (E8), BL033 (version of BL002) and BL087, and 5CB (commercially available at Sigma-Aldrich). There is provided below a structural formula for nematic liquid crystals compounds that are included in the commercially available E7 and of 5CB:

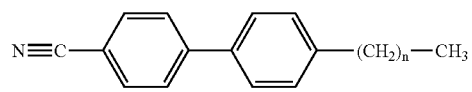

where E7 is a mixture of compounds where n is 4, 6, and 7, and 5CB is a single compound where n is 5.

B. Cholesteric Liquid Crystals

Cholesteric liquid crystals possessing a positive dielectric anisotropy with a helical pitch chosen to reflect for example in the IR or Near IR regions are suitable for the purposes of the invention. The cholesteric liquid crystals generally can be categorized into three main types.

In a first main type, the cholesteric liquid crystal can be a mixture of a cholesteric liquid crystal mixture and a nematic liquid crystal in an amount sufficient to produce desired helical pitch length. Suitable cholesteric liquid crystal mixtures include for example BL mixtures available from EM Industries, Inc. (BL088, BL 90, BL94 and BL108 as a few examples). The helical pitch is tuned to the desired range by mixing this cholesteric liquid crystal mixture with a nematic liquid crystal described herein.

In a second main type, the cholesteric liquid crystal can be made from a mixture of a nematic liquid crystal and a chiral material in an amount sufficient to generate a desired pitch length. Any chiral material soluble into a nematic liquid crystal is suitable for the purposes of this invention as long as it is of high enough enantiomeric or diastereoisomeric purity and it has high enough twisting power. High performance chiral materials are commercially available at Merck, for example ZLI4571, ZLI4572 (R1011), S811 and R811. In particular, R1011 and S811 may include compounds with the structural formulas depicted below.

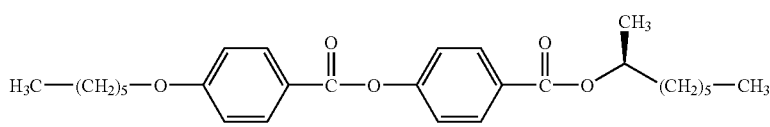

S811

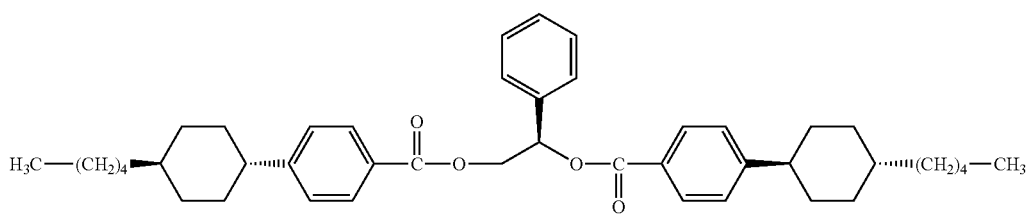

R1011

In a third main type, the cholesteric liquid crystal can be a nematic liquid crystal single compound which is also chiral (hence the name of chiral nematic liquid crystal). Optionally, the chiral nematic liquid crystal single compound can be mixed with a chiral nematic liquid crystal mixture or with a chiral non-liquid crystal material to tune the helical pitch to the desired value. A few examples of such single compound chiral nematic liquid crystals are shown below.

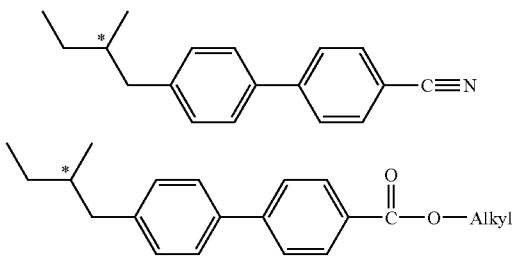

II. Liquid Crystal Domain Stabilizing Compounds

The liquid crystal domain stabilizing compound encompasses any compound that: (1) induces (or allows) (along with an applied electric field) the switching between the smaller liquid crystal domains and larger liquid crystal domains; and (2) maintains the liquid crystal domain size after switching when the electric field is zero. It is believed that the liquid crystal domain stabilizing compound places itself mostly at the boundaries of the liquid crystal domains, and only a low percentage of it if any is placed within the liquid crystal helices. In embodiments, the liquid crystal domain stabilizing compound is an organic dipolar compound such as those illustrated herein. An organic dipolar compound as illustrated in the formulas (1) through (6) is a conjugated structural unit possessing an electron acceptor group and an electron acceptor group. This structural unit has a permanent dipole moment large enough so that it can be rotated by an applied electric field.

Liquid Crystal Domain Stabilizing Compounds of Formula (1) through Formula (6)

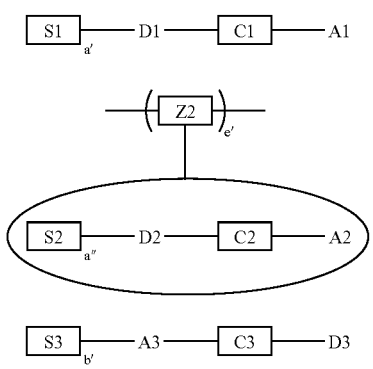

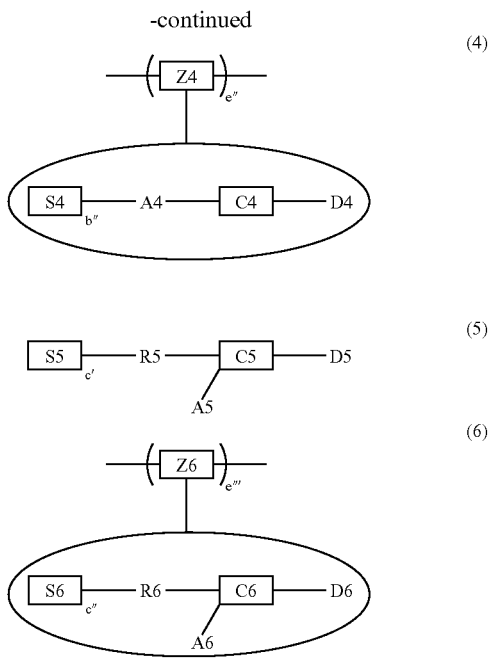

Formulas (1) through (6) schematically represent useful dipolar compounds suitable for the purpose of this disclosure. While the different moieties are connected schematically through single bonds, they may possess single, double or triple bonds. "Small molecule" liquid crystal domain stabilizing compounds are exemplified by compounds corresponding to formulas (1), (3), and (5). "Macromolecule" liquid crystal domain stabilizing compounds which are an oligomer/polymer are exemplified by compounds corresponding to formulas (2), (4), and (6). A polymerized liquid crystal domain stabilizing compound comprising a dipolar monomer and a non-dipolar monomer (discussed herein) is also considered a "macromolecule" liquid crystal domain stabilizing compound. In embodiments, the liquid crystal domain stabilizing compounds may absorb at a portion of the spectrum that is compatible with the operation of the photonic device; for instance, where the photonic device is a display device, the liquid crystal domain stabilizing compounds may absorb in the UV or slightly in the visible range. In embodiments, the liquid crystal domain stabilizing compounds are colorless having little absorbance for example in the visible range so that when dissolved in the liquid crystal composition in a few percents, a thin film of such a liquid crystal composition appears colorless.

The electron donor moiety (D1 through D6) may be any suitable atom or group capable of donating electrons, which in embodiments according to Hammett equation may possess a negative Hammett constant ($\sigma p$). In embodiments, the electron donor moiety (D1 through D6) is an atom which may require one or more additional moieties in order to fulfill its valence requirements (for example, a nitrogen atom has three valences). In embodiments, the electron donor moiety (D1 through D6) may be selected from the group consisting of:

(a) an atom selected from the group consisting of N, O, S, P, Cl, Br, and I, where the valence of the atom is satisfied by bonding with the liquid crystal compatibilizing moiety (S1 through S6) and/or conjugated bridging moiety (C1 through C6) and optionally with the polymerizable moiety (Z2, Z4, Z6);

(b) an atom selected from the group consisting of N, O, S, and P bonded to the liquid crystal compatibilizing moiety (S1 through S6) and/or conjugated bridging moiety (C1 through C6) and optionally with the polymerizable moiety (Z2, Z4, Z6), where the atom also is bonded to at least one other moiety to satisfy the valence of the atom;
(c) ferrocenyl;
(d) azulenyl; and
(e) at least one aromatic heterocyclic ring having from about 5 to about 30 atoms (referring to number of carbon atoms and heteroatom(s)) where the heteroatom is for example oxygen (like for example furan, benzofuran, dibenzofuran), sulfur (like for example 1,4-dithiin, benzo-1,4-dithiin, dibenzo-1,4-dithiin, tetrathiafulvalene, thiophen, benzothiophen, dibenzothiophen), or nitrogen (like for example pyrrole, indole, carbazole, pyrazole, imidazol), selenium (like for example selenophen, benzoselenophen, dibenzoselenophen), and tellurium (like for example tellurophen, benzotellurophen, dibenzotellurophen).

In embodiments, the electron donor moiety (D1, D2) is selected from the group consisting of:
(a) an atom selected from the group consisting of N, O, S, and P, where the valence of the atom is satisfied by bonding with S1/S2 and C1/C2;
(b) an atom selected from the group consisting of N, O, S, and P bonded to S1/S2 and C1/C2, where the atom also is bonded to at least one other moiety to satisfy the valence of the atom;
(c) ferrocenyl;
(d) azulenyl; and
(e) at least one aromatic heterocyclic ring as described herein.

The other moiety or moieties to satisfy the valence of the atom selected as the electron donor moiety (D1 through D6) may be for instance a hydrogen atom, or a hydrocarbon group such as the following:
(a) a straight alkyl chain having for example 1 to about 20 carbon atoms, particularly 1 to about 12 carbon atoms, such as pentyl, decyl and dodecyl;
(b) a branched alkyl group having for example 3 to about 40 carbon atoms, particularly 3 to about 30 carbon atoms such as isopropyl, isopentyl and 2-propyl-pentyl;
(c) a cycloalkyl group having for example 3 to about 30 carbon atoms, particularly 4 to 7 carbon atoms in the cycle, such as cyclopentyl and cyclohexyl; and
(d) an aryl group, an arylalkyl group or alkylaryl group having for example 7 to about 30 carbon atoms such as p-methyl-benzyl, 3-(p-ethyl-phenyl)-propyl and 5-(1-naphthyl)-pentyl.

The conjugated bridging moiety (C1 through C6) may be any suitable group through which electrons can pass from the electron donor moiety (D1 through D6) to the electron acceptor moiety (A1 through A6). In embodiments, the conjugated bridging moiety (C1 through C6) is a π-electron conjugated bridge that is composed of for example (there is no overlap among the categories (a), (b), and (c) described below):
(a) at least one aromatic ring such as one, two or more aromatic rings having for instance from about 6 carbon atoms to about 40 carbon atoms such as —$C_6H_4$—, and —$C_6H_4$—$C_6H_4$—;
(b) at least one aromatic ring such as one, two or more aromatic rings conjugated through one or more ethenyl or ethynyl bonds having for instance from about 8 carbon atoms to about 50 carbon atoms such as —$C_6H_4$—CH=CH—$C_6H_4$—, and —$C_6H_4$—C≡C—$C_6H_4$—; and
(c) fused aromatic rings having for instance from about 10 to about 50 carbon atoms such as 1,4-$C_{10}H_6$ and 1,5-$C_{10}H_6$.

The liquid crystal compatibilizing moiety (S1 through S6) may be any suitable group that increases miscibility of the liquid crystal domain stabilizing compound with the liquid crystal. The liquid crystal compatibilizing moiety (S1 through S6) can be 1, 2, 3, or more groups, where each group may be the same or different from each other. The liquid crystal compatibilizing moiety (S1 through S6) may be for example the following:
(a) a substituted or unsubstituted hydrocarbon having for example 1 to about 30 carbon atoms.
(b) a heterocyclic moiety having for example from 5 to about 15 atoms (referring to number of carbon atoms and heteroatom(s), where the heteroatom can be for instance N, O, S, P, and Se. Exemplary examples include: piperidine, ethyl-piperidine, methylpirrolidine.
(c) a hetero-acyclic moiety having for example from 5 to about 15 atoms (referring to number of carbon atoms and heteroatom(s), where the heteroatom can be for instance N, O, S, P, and Se. Exemplary examples include: glycol and polyglycol ethers, alcohol moieties like for example 2-hydroxy-ethyl, and thiol moieties like for example ethyl-2-methyl-ethyl-thioether.

When the liquid crystal compatibilizing moiety (S1 through S6) is a hydrocarbon, the hydrocarbon may be for example the following:
(a) a straight chain alkyl group having for example 2 to about 30 carbon atoms, particularly 2 to about 12 carbon atoms, such as pentyl, decyl and dodecyl.
(b) a branched alkyl group having for example 3 to about 40 carbon atoms, particularly 3 to about 30 carbon atoms such as isopropyl, isopentyl and 2-propyl-pentyl.
(c) at least one cycloalkyl group such as one, two or more bonded cycloalkyl groups having for example 3 to about 8 carbon atoms, particularly 4 to 7 carbon atoms in the cycle, such as cyclopentyl and cyclohexyl. Optionally, one or more hydrogen atoms of the cycloalkyl group may be replaced with for example an alkyl group having for example 1 to about 20 carbon atoms, an arylalkyl group having for example 3 to about 30 carbon atoms, a cycloalkyl group having for example 3 to about 8 carbon atoms, particularly 4 to 7 carbon atoms in the cycle, or an alkylcycloalkyl group having for example 4 to about 30 carbons.
(d) an arylalkyl group or alkylaryl group having for example 7 to about 30 carbon atoms such as p-methyl-benzyl, 3-(p-ethyl-phenyl)-propyl and 5-(1-naphthyl)-pentyl.

In embodiments, the liquid crystal compatibilizing moiety (S1 through S6) may be a hydrocarbon optionally substituted with for example a liquid crystal moiety, a heterocyclic moiety optionally substituted with for example a liquid crystal moiety, or a hetero-acylic moiety optionally substituted with for example a liquid crystal moiety. The liquid crystal moiety may be composed of for example: (i) a flexible portion—hard core moiety composed of a flexible moiety such as an alkyl chain containing from about 4 to about 10 carbon atoms connected to a hard core comprised of a cyan (CN) group connected to a biphenyl or terphenyl, where the flexible portion—hard core moiety includes a connecting moiety; or (ii) a cholesteryl group including a connecting moiety.

To create the connecting moiety in the liquid crystal moiety, an atom (e.g, hydrogen) may be removed from a compound described herein as a liquid crystal; the removed atom is replaced with a connecting moiety which is either an atom (like for example O, N, S, or P) or a group (like for example —O—C(O)—, —C(O)—, —O—(CH$_2$)$_n$—O—) having at least two available valences and which is capable of bonding the liquid crystal moiety to the rest of the liquid crystal compatibilizing moiety (S1 through S6). For example, in compound 1-V, a hydrogen atom from a liquid crystal compound $CH_3$—$(CH_2)_4$—$C_6H_4$—$C_6H_4$—CN was replaced with an O atom, resulting in liquid crystal moiety, to allow bonding with the liquid crystal domain stabilizing compound through —$CH_2$ group. The whole group is assigned as S1. The term "liquid crystal moiety" is used even if the removal of atom or atoms from a compound described herein as a liquid crystal results in a liquid crystal moiety which does not possess a liquid crystal nature.

The polymerizable moieties Z2, Z4 and Z6 may be any monomers that can be polymerized to form an oligomer/polymer. Suitable monomers include those having a double bond (—CH=$CH_2$) or triple bond capable of being polymerized such as acryl or ethenyl. One or more hydrogen atoms in the monomer may be optionally replaced with for example the following: (a) alkyl chains having from 1 to about 10 carbon atoms; (b) substituted alkyl chains such as alkoxy, halide substituted alkyl groups (halides like F, Cl, Br, and I), and amino-alkyl groups where the alkyl moiety has from 1 to about 10 carbon atoms. Exemplary examples of polymerizable moieties are $H_2C$=CH—C(O)—O-(acryl), $H_2C$=C($CH_3$)—C(O)—O— (methacryl), $H_2C$=C($C_2H_5$)—C(O)—O— (ethacryl), —CH=$CH_2$ (vinyl), and —C($CH_3$)=$CH_2$. The polymerizable moiety $Z_i$ (i=2, 4, 6) may be attached to $S_i$ (i=2, 4, 6), $D_i$ (i=2, 4, 6), $C_i$ (i=2, 4, 6), $A_i$ (i=2, 4, 6) or R6.

The values e', e'' and e''' represent the degree of polymerization and are numbers ranging for example from 1 to about 100 or higher.

The values a', a'', b', b'', c', c'' are integers such as for example from 1 to 3.

A first exemplary group of liquid crystal domain stabilizing compounds are encompassed by formula (1) and formula (2). In formula (2) the repetitive dipolar structural unit composed of S2, D2, C2, and A2 is similar to compounds represented by formula (1) except that one of the moieties of the dipolar structural unit is bound to Z2.

The electron acceptor moiety (A1,A2) may be any suitable atom or group capable of accepting electrons. In embodiments, the electron acceptor moiety (A1,A2) is an electron withdrawing functional moiety which according to Hammett equation possesses a positive Hammett constant (σp). The electron acceptor moiety (A1,A2) may be for example the following:
(a) an aldehyde (—CO—H);
(b) a ketone (—CO—R) where R may be for example a straight chain alkyl group having for example 1 to about 20 carbon atoms, particularly 1 to about 12 carbon atoms, such as methyl, ethyl, pentyl, decyl and dodecyl; a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl; an arylalkyl group or alkylaryl group having for example 7 to about 30 carbon atoms such as p-methyl-benzyl, 3-(p-ethyl-phenyl)-propyl and 5-(1-naphthyl)-pentyl;
(c) an ester (—COOR) where R may be for example a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl;
(d) a carboxylic acid (—COOH);
(e) cyano (CN);
(f) nitro ($NO_2$);
(g) nitroso (N=O);
(h) a sulfur-based group (e.g., —$SO_2$—$CH_3$; and —$SO_2$—$CF_3$);
(i) a fluorine atom;
(j) an alkene (—CH=$CR_2$ or —CH=CHR) where each R independently may be for example a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl; and
(k) a boron atom.

Exemplary examples of liquid crystal domain stabilizing compounds encompassed by formula (1) are shown below.

1-I

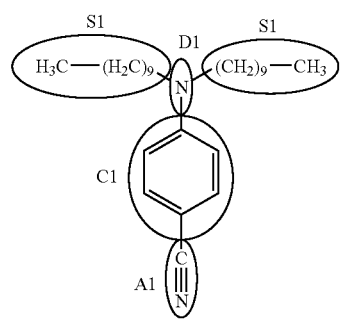

1-II

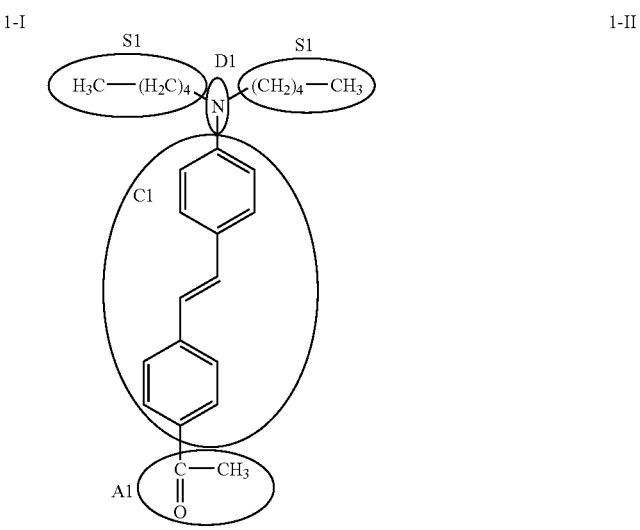

-continued

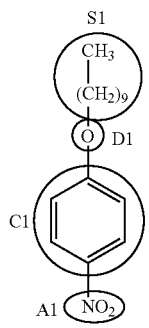

1-III

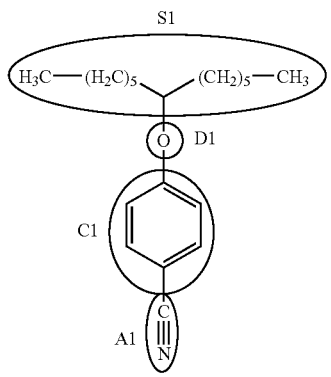

1-IV

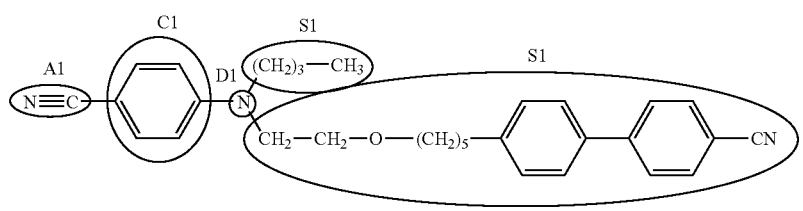

1-V

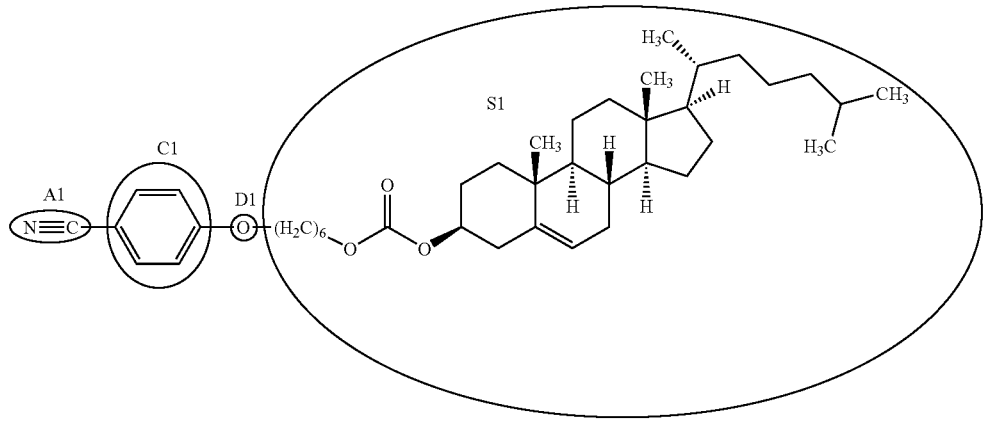

1-VI

Compounds of type 1-I and 1-II are prepared by palladium catalyzed coupling reaction of the bromo or iodo aromatic precursor with secondary amines. General synthetic procedures for this widely used coupling reaction are known (J. P. Wolfe et al., "Room temperature catalytic amination of aryl iodides", J. Org. Chem., 1997, 62, p. 6066; J. P. Wolfe et al., "Scope and limitations of the Pd/BINAP-catalyzed Amination of aryl bromides", J. Org. Chem., 2000, 65, p. 1144.; J. F. Hartwig, "Transition metal catalyzed synthesis of arylamines and aryl ethers from aryl halides and triflates: scope and mechanism." Angewandte Chemie, International Edition (1998), 37(15), p. 2046; Hartwig, John F. "Carbon-Heteroatom Bond-Forming Reductive Eliminations of Amines, Ethers, and Sulfides" Accounts of Chemical Research, 1998, 31(12), 852). The disclosures of the above recited documents are totally incorporated herein by reference. The reaction proceeds in the presence of a base like t-BuONa, and with a palladium based catalyst formed in situ from a soluble palladium precursor like tris(dibenzylidenacetone)dipalladium ($Pd_2DBA_3$) and a ligand like 1,1'-bis(diphenylphosphino)ferrocene (DPPF) or 2,2'-Bis(diphenylphosphino)1-1'-binaphtyl (BINAP).

Compounds of type 1-III and 1-IV are synthesized by coupling the phenoxyde anion precursor with a bromo-alkyl derivative. The anion is prepared by using a base like $K_2CO_3$ (general procedure is described for example in Organic Syntheses, Coll. Vol 3, p. 140, the disclosure of which is totally incorporated herein by reference).

Compounds 1-V and 1-VI illustrate the embodiments where the liquid crystal compatibilizing moiety (S1, S2) contains a liquid crystal moiety. Compound 1-V is synthesized by coupling the alcohol precursor with a bromo-derivative containing the liquid crystal moiety (4-alkyl-cyano-biphenyl) in the presence of a base. Compound 1-VI is synthesized by reacting the alcohol precursor with cholesterylchloroformate in presence of an organic base like triethylamine.

In embodiments of the present invention, there is excluded from the compounds of formula (1) an excluded compound defined by a' is 2, A1 is cyano, C1 is phenyl, D1 is nitrogen, and each S1 is the same alkyl group. In embodiments, one, two or more of the following occur: a' is other than 2; A1 is other than cyano; C1 is other than phenyl, D1 is other than nitrogen, and one or both S1 is other than a straight chain alkyl group.

Examples of macromolecular compounds of formula (2) are shown below. In compound 2-I, the polymerizable group Z2 is vinyl; in compound 2-II, the polymerizable group is an acrylic function; and in compound 2-III, the polymerizable group is a methacrylic function. In these cases, the polymerizable group is bonded to the liquid crystal compatibilizing group. Compound 2-IV is an example where the polymerizable group Z2 is bonded to the electron acceptor moiety.

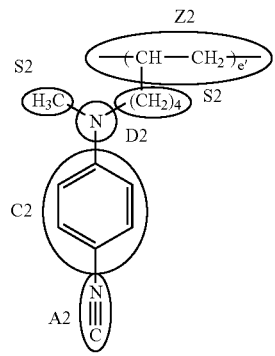

2-I

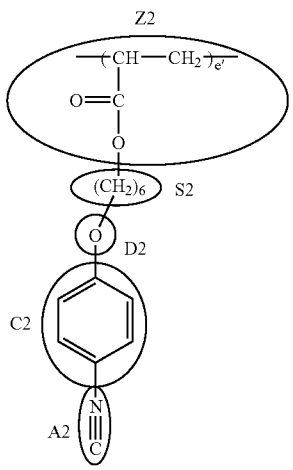

2-II

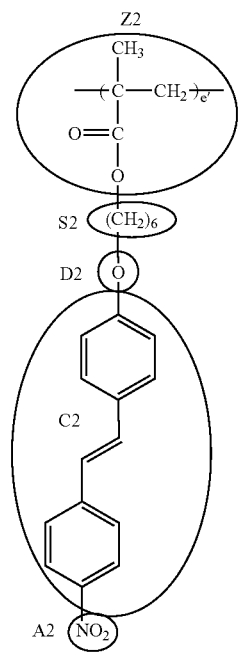

2-III

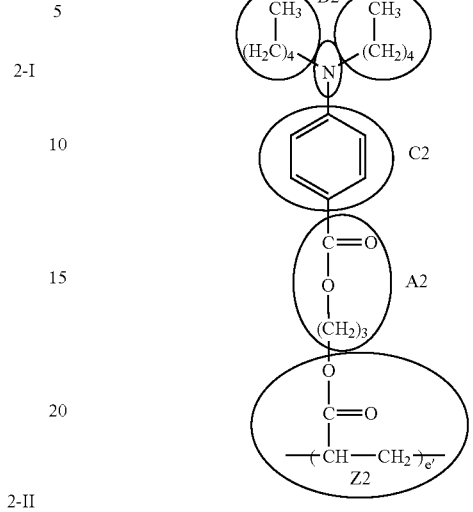

2-IV

The dipolar structural unit (composed of S2, D2, C2, and A2) is synthesized by palladium catalyzed coupling reaction as already described for compounds of formula (1). S2 is synthesized by reacting the phenoxide anion with bromoalkyl alcohols (Br—$(CH_2)_n$—OH for compounds 2-II through 2-IV). The monomers (Z2 bonded to dipolar structural unit composed of S2, D2, C2, and A2) are polymerized by reacting the previous alcohol derivative with acryloyl chloride (2-II and 2-IV) or methacryloyl chloride (compound 2-III). General procedures are known as described in G. Iftime et al. "Synthesis and Characterization of Two Chiral Azobenzene-Containing Copolymers" Macromolecules, 2002, 35(2), 365, the disclosure of which is totally incorporated herein by reference. The polymerization may be done in situ, by using thermal or photochemical initiation.

A second exemplary group of liquid crystal domain stabilizing compounds is encompassed by formula (3) and (4). In compounds of formula (3) and (4) the liquid crystal compatibilizing moieties (S3, S4) are bonded to the electron acceptor moieties (A3 and A4, respectively). In formula (4) the repetitive dipolar structural unit composed of S4, D4, C4, and A4 is similar to compounds represented by formula (3) except that one of the moieties of the dipolar structural unit is bound to Z4.

The electron acceptor moiety (A3, A4) may be any suitable atom or group capable of accepting electrons and which possess a valence capable of forming a bond with the liquid crystal compatibilizing moiety (S3,S4). In embodiments, the electron acceptor moiety (A3, A4) is an electron withdrawing functional moiety which according to Hammett equation possesses a positive Hammett constant (σp). The electron acceptor moiety (A3, A4) may be for example the following:

(a) a carbonyl group (—CO—);
(b) a carboxyl group (—COO—);
(c) a sulphone (—$SO_2$—);
(d) an alkene (—CH═C(R)—) where R may be for a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl; and (e) an imine group (—C=N—).

Examples of compounds corresponding to formula (3) are shown below:

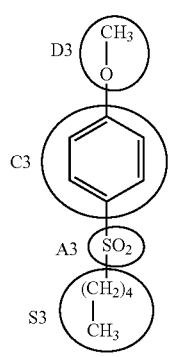

3-I

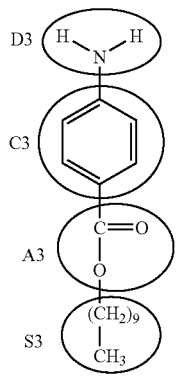

3-II

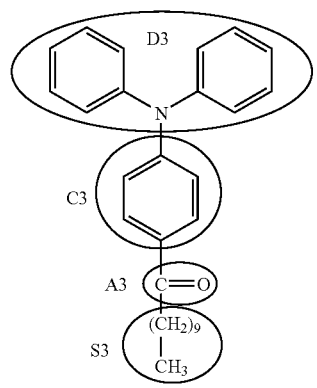

3-III

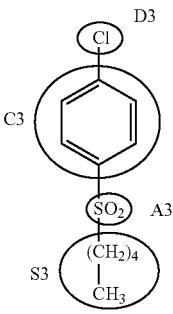

3-IV

Sulphone group (—SO$_2$—) in compounds 3-I and 3-IV is generated by oxidation of the corresponding sulfide (—S—) for example with hydrogen peroxide (general procedure described in Z.-S. Hu et al., "Novel polyesters with amino-sulfone azobenzene chromophores in the main chain", J. Polym. Sci., Part A: Polymer Chemistry, 2000, 38, p. 2245, the disclosure of which is totally incorporated herein by reference). Alkyl ester groups are synthesized by one of the many known procedures of esterification. A preferred mild procedure is 1,3-dicyclohehylcarbodiimide (DCC) coupling of the carboxylic acid function with the corresponding alcohols, generally in dichloromethane as a solvent (general procedure is described for example in J. Am. Chem. Soc., 1986, 108, p. 3112, the disclosure of which is totally incorporated herein by reference).

Examples of macromolecular compounds corresponding to formula (4) are shown below.

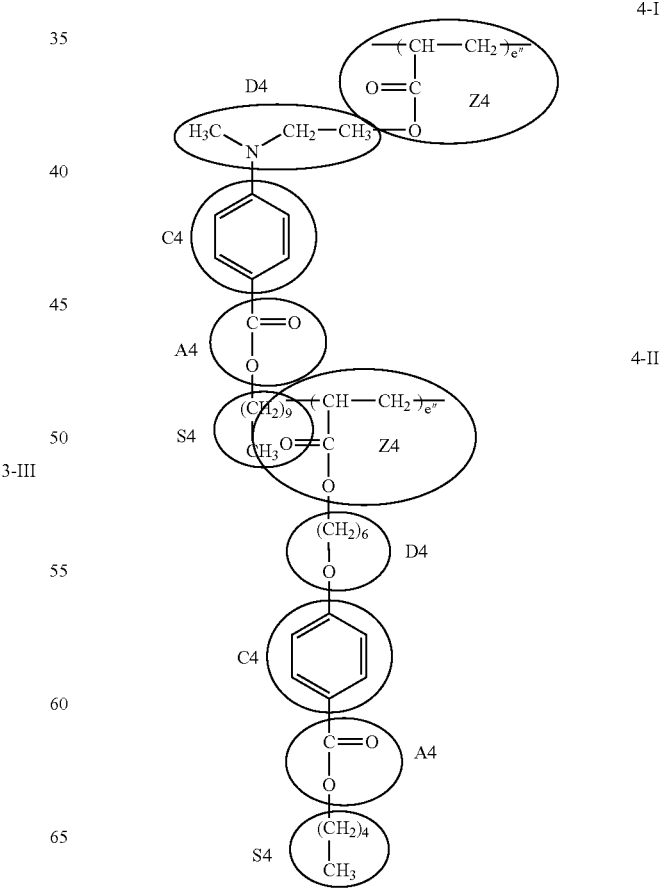

-continued

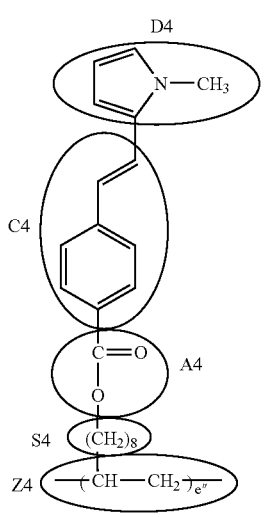

4-III

Monomers corresponding to the polymeric structures of formula (4) may be synthesized by 1,3-dicyclohehylcarbodiimide (DCC) coupling of the carboxylic acid function of the benzoic acid precursors with the corresponding alcohols, generally in dichloromethane as a solvent (general procedure is described for example in J. Am. Chem. Soc., 1986, 108, p. 3112, the disclosure of which is totally incorporated herein by reference). The polymerization may be done in situ, by using thermal or photochemical initiation.

A third exemplary group of liquid crystal domain stabilizing compounds is encompassed by formulas (5) and (6). In embodiments of compounds of formula (5) and (6), the liquid crystal compatibilizing moiety (S5, S6) is bonded to the conjugated bridging moiety (C5,C6) through a "direct bond" (i.e., the spacer moiety (R5, R6) is absent) or through an optional spacer moiety (R5, R6).

In formula (6), the repetitive dipolar structural unit composed of S6, R6, D6, C6, and A6 is similar to compounds represented by formula (5) except that one of the moieties of the dipolar structural unit is bound to Z6. A5 and A6 are electron acceptor moieties identical to A1 and A2. In addition, D5 and D6 are electron donor moieties identical to D3 and D4.

The electron acceptor moiety (A5,A6) may be any suitable atom or group capable of accepting electrons. In embodiments, the electron acceptor moiety (A5,A6) is an electron withdrawing functional moiety which according to Hammett equation possesses a positive Hammett constant (σp). The electron acceptor moiety (A5,A6) may be for example the following:

(a) an aldehyde (—CO—H);
(b) a ketone (—CO—R) where R may be for example a straight chain alkyl group having for example 1 to about 20 carbon atoms, particularly 1 to about 12 carbon atoms, such as methyl, ethyl, pentyl, decyl and dodecyl; a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl; an arylalkyl group or alkylaryl group having for example 7 to about 30 carbon atoms such as p-methyl-benzyl, 3-(p-ethyl-phenyl)-propyl and 5-(1-naphthyl)-pentyl;
(c) an ester (—COOR) where R may be for example a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl;
(d) a carboxylic acid (—COOH);
(e) cyano (CN);
(f) nitro ($NO_2$);
(g) nitroso (N=O);
(h) a sulfur-based group (e.g., —$SO_2$—$CH_3$; and —$SO_2$—$CF_3$);
(i) a fluorine atom;
(j) an alkene (—CH=$CR_2$ or —CH=CHR) where each R independently may be for example a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl; and
(k) a boron atom.

The spacer moiety (R5, R6) may be any atom or group having at least two available valences and which is capable of forming bonds with both the conjugated bridging moiety (C5,C6) on one side and with the liquid crystal compatibilizing moiety (S5, S6) on the other side, and which may be for example the following:

(a) a direct bond (that is, the spacer moiety (R5, R6) is absent);
(b) an oxygen atom;
(c) a sulfur containing moiety such as a sulfur atom or a sulfur group like —SO—, —$SO_2$—;
(d) a glycol ether unit having a formula —(O—$CH_2$—$CH_2$)$_n$—O— where n is an integer from 1 to about 5.
(e) a nitrogen containing moiety which is a nitrogen atom or of type —N(R)—, where R may be for example a hydrogen, a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl.

Examples of compounds corresponding to formula (5) are shown below:

Examples of compounds represented by formula (6) are shown below.

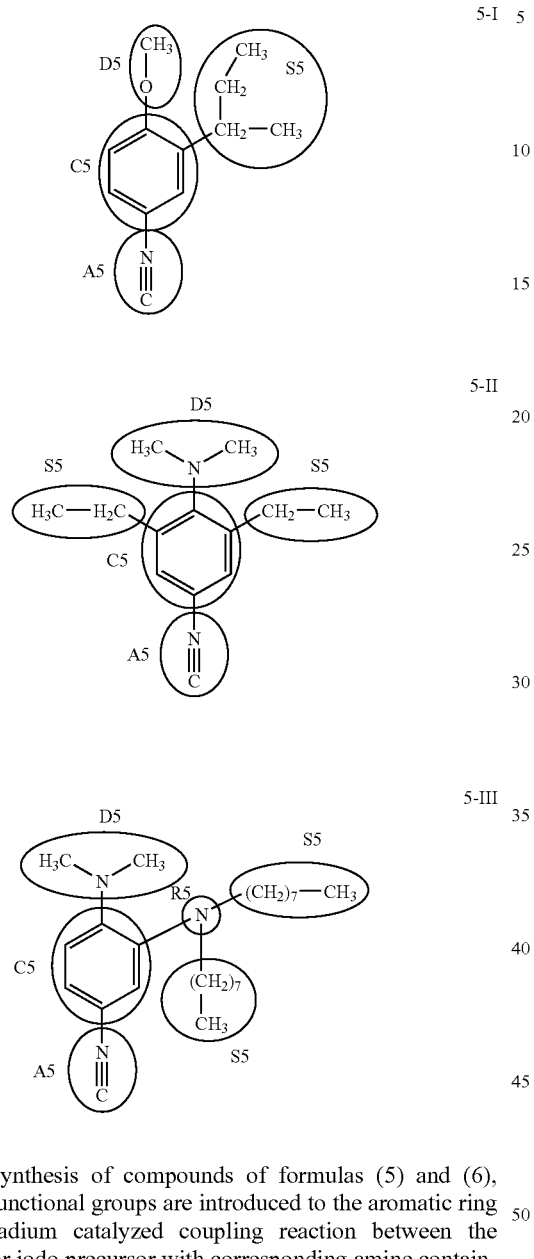

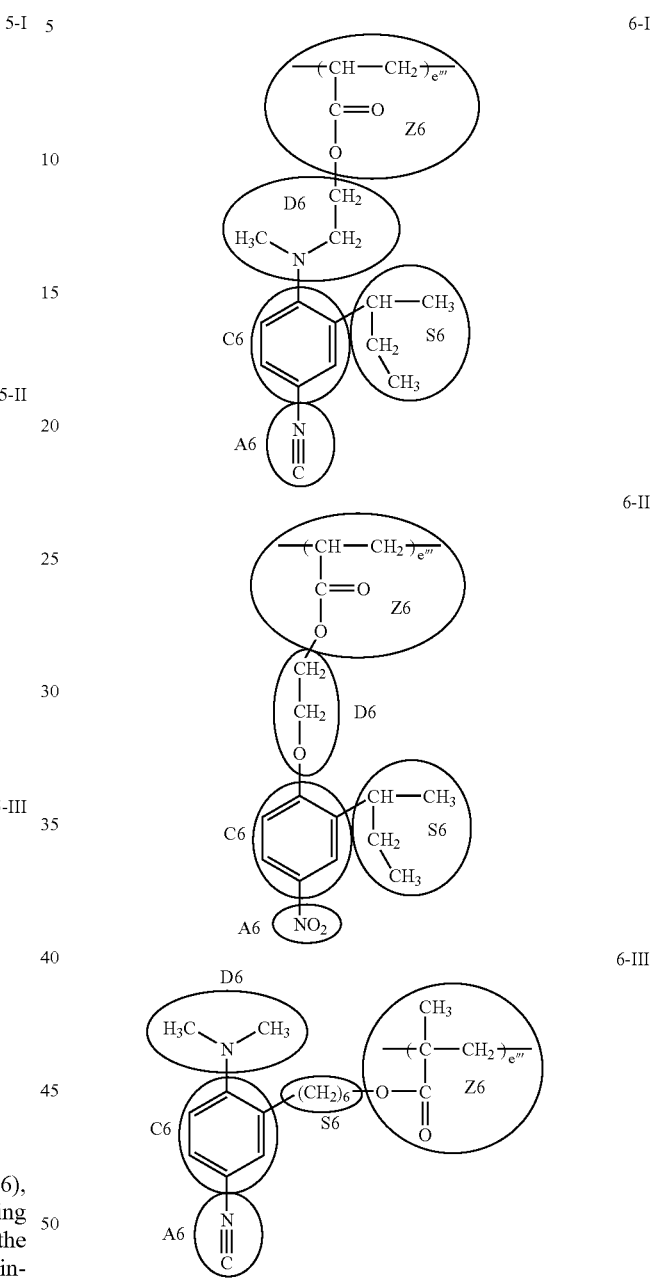

For synthesis of compounds of formulas (5) and (6), amino functional groups are introduced to the aromatic ring by palladium catalyzed coupling reaction between the bromo or iodo precursor with corresponding amine containing at least one N—H bond using procedures similar to that described in J. F. Hartwig, "Transition metal catalyzed synthesis of arylamines and aryl ethers from aryl halides and triflates: scope and mechanism," Angewandte Chemie, International Edition (1998), 37(15), p. 2046; and Hartwig, John F. "Carbon-Heteroatom Bond-Forming Reductive Eliminations of Amines, Ethers, and Sulfides," Accounts of Chemical Research, 1998, 31(12), 852, the disclosures of which are totally incorporated herein by reference. Friedel-Crafts alkylation allows insertion of alkyl groups to the aromatic ring (textbook: Olah, George A. "Friedel-Crafts Chemistry", 1973, the disclosure of which is totally incorporated herein by reference). For synthesis of compounds of formula (6), polymerization is being initiated thermally or photochemically.

There may be situations in the description of compounds of formulas (1) through (6) where a moiety can be seen as having two functions. This may create some difficulties in assigning the type of moieties for the examples shown in the structures. However, when assigning these functions we take into account the primary function only. For example, in the case of compound 5-III, the —N(CH$_3$)$_2$ was assigned as D5, but the other N atom could be viewed as having an electron donor function as well. However, the main role of the other N atom is to allow bonding of two S5 groups, and thus it was assigned as R5. In addition, the other N atom is placed in a meta-position with respect to the electron acceptor moiety A5, so that conjugation with A5 is minimal, when compared with conjugation of D5 with A5 (para-position allows for strong electron transfer through the conjugated bridging moiety from D5 to A5).

In embodiments, the liquid crystal composition can include a single liquid crystal domain stabilizing compound. In other embodiments, the liquid crystal composition can include two, three, or more different liquid crystal domain stabilizing compounds. In embodiments, there may be present a combination of a macromolecule liquid crystal domain stabilizing compound and a small molecule liquid crystal domain stabilizing compound. The different liquid crystal domain stabilizing compounds may be present in the liquid crystal composition in any suitable equal or unequal ratio ranging for example from about 10% (first liquid crystal domain stabilizing compound): about 90% by weight (second liquid crystal domain stabilizing compound) to about 90% (first liquid crystal domain stabilizing compound): about 10% by weight (second liquid crystal domain stabilizing compound).

The liquid crystal composition is prepared for example by mixing a liquid crystal of a selected helical pitch with the liquid crystal domain stabilizing compound along with one or more other optional ingredients (e.g., a dispersant and a non-dipolar co-monomer) as described herein. The liquid crystal composition may be homogenized by shaking and/or stirring.

The liquid crystal domain stabilizing compound has a solubility in the liquid crystal ranging for example from about 0.1% to 100% by weight at room temperature (about 25 degrees C.). An elevated temperature ranging from about 40 to about 130 degrees C. may be used to facilitate dissolution of the liquid crystal domain stabilizing compound in the liquid crystal. Insoluble amounts of the liquid crystal domain stabilizing compound may be optionally removed by filtration.

In embodiments, an initiator or initiators may be used to facilitate synthesis of a "macromolecule" liquid crystal domain stabilizing compound. The initiator may be any suitable compound that facilitates polymerization of the monomers used in forming the oligomer/polymer. In embodiments, the polymerization is done in situ, by using thermal or photochemical initiation. In the case of thermal initiation classical initiators can be used and they are known to those skilled in the art. Examples of thermal initiators include for example 2,2'-azobisisobutyronitrile (AIBN) or benzoyl peroxide. Polymerization is carried at temperatures between about 30 to about 100 degrees C., depending on the desired initiation rate and on the thermal initiator used in the process. A thermal initiator may be added in an amount from about 0.01% to about 10%, or from about 0.1% to about 1%, with respect to the total amount of the liquid crystal composition.

Photochemical initiation may be done by using visible light initiation. This option may be preferable to the classical UV initiation because in embodiments the monomers may absorb too much in the UV range, slowing down or stopping the polymerization. Visible light initiators include for example camphoroquinone or H-Nu 470. They initiate the polymerization when subjected to 470 nm wavelength light. The photochemical initiator may be added in an amount of about 0.01% to about 3%, or from about 0.1% to about 1%, with respect to the total amount of liquid crystal composition. When photochemical initiation is performed, the liquid crystal composition contains also the amount of initiator. To prevent premature polymerization, while preparing the liquid crystal composition, in these embodiments, the mixture is heated for only short periods of time for example about 1 to about 5 minutes at a lower temperature ranging for example from about 30 to about 50 degrees C.

A dispersant or a mixture of two or more different dispersants may be optionally included in the liquid crystal composition. The dispersant(s) may be present in an amount ranging from about 0.1% to about 20% by weight, or from about 1% to about 10% by weight, based on the weight of the liquid crystal composition. Where two or more different dispersants are used, the different dispersants may be present in the liquid crystal composition in any suitable equal or unequal ratio ranging for example from about 10% (first dispersant): about 90% by weight (second dispersant) to about 90% (first dispersant): about 10% by weight (second dispersant). In embodiments, the dispersant may be added to those liquid crystal compositions containing a "small molecule" liquid crystal domain stabilizing compound. In other embodiments, the dispersant may be added to those liquid crystal compositions containing a "macromolecule" liquid crystal domain stabilizing compound. The dispersant may be any suitable compound that being present at the boundaries of liquid crystal domains acts as a barrier to association of neighboring liquid crystal domains, preventing their growth and re-alignment after the voltage is turned off. In embodiments, the addition of a dispersant results in longer term stability of the white state (described herein) and in improved uniformity of the white state. The dispersant in embodiments is typically miscible with the liquid crystal composition.

Dispersants are for instance non-aqueous surfactants which are typically used for dispersing particles in high resistivity media. Dispersants useful for this invention are for example neutral non-ionic molecules or oligomers containing hydrophilic and hydrophobic groups.

For compatibility with the liquid crystal composition, dispersants may possess relatively large alkyl chains, containing for example from about 5 to about 50 carbon atoms, or from about 8 to about 30 carbon atom chains. The alkyl chains can be straight or may optionally be branched or may contain one or more aromatic rings, to increase compatibility with the liquid crystal composition. Dispersants include, but are not limited to the following:

(a) polyoxylethylene glycol and derivatives thereof with a molecular weight from about 100 to about 3,000. Derivatives can be hydroxy-terminated polyoxylethylene glycols; polyoxyethylene alkyl ethers with an alkyl group containing from about 1 to about 30 carbon atoms, which can be for example lauryl, cetyl, stearyl, oleyl; polyoxyethylene esters of fatty acids where the fatty acid contains from about 1 to about 30 carbon atoms, like for example oleic acid, lauric acid, and stearic acid.

(b) alkanolamides resulted from condensation of fatty acids with alkanolamines, having from 8 to about 60 carbon atoms.

(c) aminoxydes of general structure $R_1R_2R_3NO$ where the $R_1$, $R_2$ and $R_3$ groups are independently selected and contain from about 1 to about 30 carbon atoms.

(d) sorbitan esters resulting from condensation of sorbitol with a carboxylic acid ester containing from about 2 carbon atoms to about 60 carbon atoms. Sorbitan esters useful for this invention are for example sorbitan monolaurate, sorbitan monostearate, sorbitan monopalmitate, sorbitan trioleate, and sorbitan tristearate.

(e) glycerol and polyglycerol mono- and poly-esters where the ester groups contain from about 2 to about 30 carbon atoms, like for example stearate, oleate, decyl, and octyl.

(f) polydimethylsiloxane polymers with a molecular weight from about 100 to about 3,000, terminated with a hydroxy group or with an alkyl, hydroxyalkyl or hydride group containing from about 0 to about 30 carbon atoms.

(g) alkyl alcohols of a general formula R—OH where R may be for a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl;

(h) non-ionic halogen containing surfactants, particularly fluorinated surfactants, possessing for example a perhalogenated hydrocarbon group. The halogen can be F, Cl, Br, or I. The non-ionic halogen-containing surfactants suitable for the present invention disclosed here can be made of for example:

(h)(1) two different structural units, the first one having a perhalogenocarbon chain of the general structure, $C_nX_m$—(C is carbon; X is a halogen such as F, Cl, Br, or I), where the chain may be straight, branched or may be a perhalogenated arylalkyl chain, where n is an integer from about 1 to about 200 and m is an integer from about 3 to about 600; and the second structural unit which does not contain $C_nX_m$—units. The second structural unit may be hydrophobic when it is made of hydrocarbon chains or silicone groups, where the hydrocarbon chains can be a straight or branched alkyl, alkylaryl, arylalkyl or cycloalkyl chain containing from about 1 to about 200 carbon atoms. The second structural unit can be hydrophilic when containing a water compatible non-ionic structure. The hydrophilic structure may be for example a poly-oxyethylated alcohol, a poly-propyleneoxyde, an alkyl, a polyhydric alcohol, and an ethanethiol derivative.

(h)(2) a single structural unit containing both a hydrophobic perhalogenocarbon chain and a hydrophilic group. Exemplary examples are fluorinated polyethers like for example poly-tetrafluoro-ethylene and poly-hexafluoro-propeneoxide.

(i) pentaerythritol ethers, esters with alcohols or carboxylic acids having from about 1 to about 30 carbon atoms and alkoxylate ethers of pentaerythritol where alkoxylate can be ethoxylate or propoxylate.

(j) sucrose esters and ethers with a carboxylic acid or an alcohol having from about 1 to about 30 carbon atoms. Optionally more than one sucrose hydroxyl groups may be reacted with the alcohol or with the carboxylic acid.

(k) block copolymers of two or more monomers having a molecular weight from about 100 to about 5,000. Block copolymers may be for example polyethyleneglycol-co-polyethylene, polyethyleneglycol-co-polypropylene glycol, polyvinylalcohol-co-ethylene and polydimethylsiloxane-co-polyethyleneglycol.

Exemplary dispersants are shown in the figure below.

$$H\mathrm{-\!\!\!-\!\!\!(\!O\!\!-\!\!CH_2\!\!-\!\!CH_2\!\!-\!\!)_n\!\!-\!\!O\!\!-\!\!H}$$

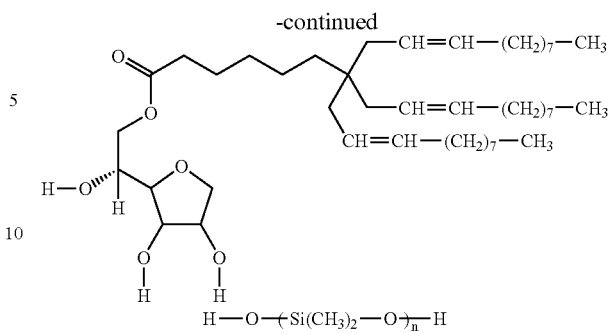

where n is an integer ranging for example from 1 to about 200.

The monomers of the "macromolecule" liquid crystal domain stabilizing compounds (e.g., compounds of formulas (2), (4), and (6)) are referred herein as dipolar monomers. To illustrate the structure of the dipolar monomers, the dipolar monomer in the compound of formula (2) corresponds to S2, D2, C2, A2, and Z2 where e' is 1.

One, two or more different types of dipolar monomers may be used in the synthesis of each "macromolecule" liquid crystal domain stabilizing compound. In embodiments, the dipolar monomer(s) may be polymerized together with an optional non-dipolar monomer (one, two, or more different types of the non-dipolar monomer) in the synthesis of each "macromolecule" liquid crystal domain stabilizing compound. The dipolar monomer(s) and the optional non-dipolar monomer(s) may be used in any suitable equal or unequal ratio (by weight or by moles). The non-dipolar monomer may be referred herein as a non-dipolar co-monomer. The term "co-monomer" includes embodiments where there is one, two, or more different types of non-dipolar monomers used with one, two or more different types of dipolar monomers.

The non-dipolar monomer contains neither an electron donor moiety nor an electron acceptor moiety, in contrast to the exemplary liquid crystal domain stabilizing compounds of formulas (1) through (6) which contain an electron donor moiety and an electron acceptor moiety. The non-dipolar monomer may be any suitable compound that improves solubility of the dipolar monomer and initiator into the liquid crystal composition. The non-dipolar monomer may be in a liquid state and contains one or more polymerizable functional groups. It is added in an amount from about 10% to about 300% by weight with respect to the amount of dipolar monomer, or from about 10% to about 50% by weight. In embodiments one, two or more non-dipolar monomers may be used. When more than one non-dipolar monomer is being used, the relative amount of each non-dipolar monomer may be from about 5% to about 95% by weight with respect the total amount of non-dipolar monomers. During the device fabrication process, the dipolar monomer(s) and non-dipolar monomer(s) are polymerized together inside the liquid crystal containment structure in the presence of the liquid crystal, initiator and optional dispersant. Due to the presence of the non-dipolar monomer(s), the structure of the macromolecular liquid crystal domain stabilizing compound incorporates the structural units of the non-dipolar monomer(s). In embodiments, the resulting liquid crystal domain stabilizing compounds are random copolymers (2, 3 or more monomers) containing dipolar structural units and non-dipolar structural units. In embodiments, the addition of the non-dipolar monomer may result in an improved uniformity of the transparent state. In embodiments without the added non-dipolar monomer, depending on the mixing time and temperature, the transparent state may exhibit a few slightly white spots, which may be the result of a non-homogeneous initial mixture due to some limited miscibility of some of the materials into the liquid crystal composition. These slightly white spots may disappear because of homogenization induced by the presence of the non-dipolar monomer.

The non-dipolar monomer may be monomers containing one or more (up to 6) polymerizable functional groups, bonded to a core. A generic formula is shown below for the non-dipolar monomer where n represent the number of polymerizable groups and is a number from 1 to about 6. The polymerizable group may be an acrylate, methacrylate, or ethacrylate polymerizable functional group.

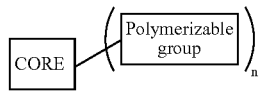

The monomer core may be:
(a) mono- or poly-radical (up to 6 radicals) of a hydrocarbon having for example 1 to about 60 carbon atoms, where the hydrocarbon may be for example a straight chain alkyl group having for example 1 to about 60 carbon atoms, particularly 1 to about 20 carbon atoms, such as 1-pentyl, 1,2-pentyl, 1,3-pentyl, 1,5,10-decyl and 1,4,8,12-dodecyl; a branched alkyl group having for example 3 to about 50 carbon atoms, particularly 3 to about 30 carbon atoms such as isopropyl, isopentyl and 2-propyl-pentyl; a cycloalkyl group having for example 3 to about 30 carbon atoms, particularly with 4 to 7 carbon atoms in the cycle, such as cyclopentyl and cyclohexyl; an arylalkyl group or an alkylaryl group having for example 7 to about 60 carbon atoms such as p-methyl-benzyl, 3-(p-ethyl-phenyl)-propyl and 5-(1-naphthyl)-pentyl; and a bisphenol radical. Exemplary non-dipolar monomers include nonyl methacrylate, lauril acrylate and diacrylate, 1,4-butanediol-diacrylate, 1,3-butylene glycol diacrylate, trimethylolpropane triacrylate and propoxylated neopentyl glycol diacrylate.
(b) glycol, polyoxylethylene glycols, alkoxylated glycols mono- and poly radicals with a molecular weight from about 100 to about 3,000. Exemplary non-dipolar monomers include ethoxylated lauryl acrylate, polyethylene glycol diacrylate, 2-(2-ethoxyethoxy) ethyl acrylate and ethoxylated nonyl phenol methacrylate, and phenoxyethyl methacrylate, propoxylated neopentyl glycol diacrylate.
(c) glycerol, alkoylated and polyalcoxylated glycerol ethers mono- and poly-radical derivatives with a molecular weight from about 100 to about 3,000, where alkoxylate can be ethoxylate or propoxylate. Exemplary non-dipolar monomers include glyceryl triacrylate, propoxylated glyceryl triacrylate.
(d) pentaerythritol, and alkoylated and polyalcoxylated ethers mono- and poly-radical derivatives thereof, with a molecular weight from about 100 to about 3,000, where alkoxylate can be ethoxylate or propoxylate. Exemplary non-dipolar monomers include dipentaerythritol pentaacrylate, and ethoxylated dipentaerythritol pentaacrylate.
(e) epoxy and modified epoxy. Exemplary non-dipolar monomers include epoxy acrylate monomers which may be modified with an amine like for example CN2100 (Sartomer product), with a fatty acids like for example CN2101 (Sartomer product), and with chlorine like for example CN 2201 (Sartomer product).
(f) radicals of alkoxylated and polyalcoxylated ethers incorporating heteroatom-containing hydrocarbon groups, with a molecular weight from about 100 to about 3,000. Exemplary non-dipolar monomers include tris-(2-hydroxy ethyl) isocyanurate triacrylate, alkoxylated tetrahydrofurfuryl acrylate.
(g) urethane and derivatives thereof with a molecular weight of about 100 to 3,000. Exemplary examples of non-dipolar monomers are for example CN-962 (urethane acrylate, Sartomer product), CN-1963 (urethane methacrylate, Sartomer product) and CN-963B80 (urethane acrylate blended with SR-238, Sartomer product).

In embodiments, using both the non-dipolar co-monomer and the dispersant may be desired.

Regarding the amounts of the various ingredients to employ in the present invention, the following illustrative proportions are provided:
(a) liquid crystal: about 80% to about 98% by weight based on the weight of the liquid crystal composition;
(b) liquid crystal domain stabilizing compound: about 2% to about 20% by weight based on the weight of the liquid crystal composition;
(c) initiator: about 0.2% to about 3% by weight based on the weight of the liquid crystal composition;
(d) dispersant: about 0.5% to about 5% by weight based on the weight of the liquid crystal composition;
(e) non-dipolar co-monomer: about 1% to about 3% by weight based on the weight of liquid crystal composition.

An illustrative example is as follows, where the percentages by weight are based on the weight of all ingredients in the liquid crystal composition:
(a) liquid crystal: 95%
(b) liquid crystal domain stabilizing compound: 3%
(c) initiator: 0.5%
(d) dispersant: 1%
(e) non-dipolar co-monomer: 0.5%.

In embodiments, multiple liquid crystal compositions (two, three or more of the same or different liquid crystal compositions) may be employed in the present device where each liquid crystal composition is disposed as a layer and the multiple liquid crystal compositions are in a stacked arrangement (involving for instance two, three or more stacked liquid crystal cells). Each liquid crystal composition is capable of forming a strongly scattering state of a first plurality of smaller liquid crystal domains that strongly scatters a predetermined light wavelength or wavelengths and a weakly scattering state of a second plurality of larger liquid crystal domains that weakly scatters the predetermined light wavelength or wavelengths.

The existence of liquid crystal domains will now be discussed. In both strongly and weakly scattering states, the helical axes of the liquid crystal are not all perfectly oriented parallel to one another. In fact, in embodiments, the helical axes of the liquid crystal may be more or less randomly oriented. Domain boundaries appear at the edges where orientation of helical axes changes. This polydomain state is known as a focal-conic state.

In embodiments, for both the strongly scattering state and the weakly scattering state, the liquid crystal domains contact one another (i.e., no void among them) and in the case of larger domains they have a lamellar shape. In the case of smaller domains, the difference between length and width is less significant. In a device where the volume occupied by the liquid crystal composition is typically fixed, the number of liquid crystal domains is inversely proportional with the domain size (i.e., domain number decreases with increased domain size if the domains contact one another with no voids between them). In embodiments, the smaller liquid crystal domains have a domain size range of for example from about 0.5 to about 10 micrometers, or any subset thereof such as from about 5 to about 10 micrometers. In embodiments, the larger liquid crystal domains have a domain size range as follows: (a) a length ranging for example from about 10 to about 40 micrometers, or any subset thereof such as from about 25 to about 30 micrometers; and (b) a width ranging for example from about 5 to about 20 micrometers, or any subset thereof such as from about 5 to about 10 micrometers.

The phrase "strongly scattering state" refers to transmission of 0% to about 20%, particularly, 0% to about 10% of the predetermined light wavelength or wavelengths and the phrase "weakly scattering state" refers to transmission of about 80% to 100%, particularly about 90% to 100% of the predetermined light wavelength or wavelengths. The light transmission values can be determined for example by making the back of the device transparent when characterization by transmission spectroscopy is performed. The light transmission values recited herein can be for each cell of the device containing a liquid crystal composition or for the total device containing two or more cells. In embodiments, values outside the light transmission ranges described herein are encompassed if there is sufficient difference in light scattering between the "strongly scattering state" and the "weakly scattering state" to enable the present device to function as for example a photonic device such as for instance a display device, an optical digital storage device, an optical switching device, or some other photonic device. The extent of light scattering depends upon a number of factors such as for example the predetermined light wavelength or wavelengths, the liquid crystal domain size, the particular liquid crystal, and the number of liquid crystal domains.

As noted herein, the phrases "weakly scattering state" and the "strongly scattering state" encompass a range of light transmission values. Consequently, for a particular liquid crystal and a predetermined light wavelength or wavelengths, there may be a single liquid crystal domain size range or a plurality of liquid crystal domain size ranges that yield the "weakly scattering state" and there may be a single liquid crystal domain size range or a plurality of liquid crystal domain size ranges that yield the "strongly scattering state." Thus, the "weakly scattering state" encompasses one or a plurality of liquid crystal domain states having the desired weakly light scattering attribute, where these various weakly scattering states may differ in the liquid crystal domain size range. Similarly, the "strongly scattering state" encompasses one or a plurality of liquid crystal domain states having the desired strongly light scattering attribute, where these various strongly scattering states may differ in the liquid crystal domain size range.

An electric field generating apparatus is operatively associated with the plurality of device electrodes, wherein the electric field generating apparatus electrically induces the change of the strongly scattering state to the weakly scattering state, and the change of the weakly scattering state to the strongly scattering state in the first liquid crystal composition and in the second liquid crystal composition. An electric field generating apparatus (external to the present device or incorporated into the device) produces and controls the desired electric fields. The electric field generating apparatus can produce an electric field ranging for example from 0 V/µm to about 10 V/µm, particularly from about 1 V/µm to about 10 V/µm, a voltage ranging from 0 V to about 250 V, particularly from about 20 V to about 120 V. The electric field generating apparatus includes driver circuitry and a power source.

The driver circuitry controls the switching of the liquid crystal compositions by regulating for example the electric field magnitude, the duration of the electric field, and the timing of changes in the electric field. In embodiments, the switching of the multiple liquid crystal compositions may be synchronized by the driver circuitry to switch substantially simultaneously to the same scattering state (e.g., all switch to weakly scattering state or all switch to strongly scattering state) or to different scattering states (e.g., at least one liquid crystal composition switches to a weakly scattering state and at least one liquid crystal composition switches to a strongly scattering state). It is understood that when the multiple liquid crystal compositions are switched substantially simultaneously to the same scattering state, the multiple liquid crystal compositions may or may not vary in characteristics such as domain number and domain size; the phrase "same scattering state" is used to distinguish in a general way from the embodiments where the multiple liquid crystal compositions are switched substantially simultaneously to different scattering states. The phrase "switched substantially simultaneously" encompasses embodiments where the multiple liquid crystal compositions all change their scattering state at the same time or all within a time difference ranging for instance from 0 to about 100 milliseconds.

Any suitable driver circuitry may be used including for example driver circuitry known to those of ordinary skill in the art. The driver circuitry is electrically coupled to the electrodes. In embodiments where the electrodes of the liquid crystal compositions are connected in parallel, only one driver circuitry set may be needed. This is advantageous for fabrication of cheaper devices. In embodiments where independent switching of two or more liquid crystal compositions is desired, a number of different driver circuitry sets matching the number of independently switching liquid crystal compositions may be used. This results in an increased price for the device, but increases the ability of the device in embodiments to show "gray" states (in addition to for example a white state and a black state).

When the "weakly scattering state" and the "strongly scattering state" are described as being switchable between each other, this encompasses the following embodiments:
(a) where the "weakly scattering state" has generally the same liquid crystal domain size range every time there is a switch to the "weakly scattering state," and where the "strongly scattering state" has generally the same liquid crystal domain size range every time there is a switch to the "strongly scattering state" (this embodiment may be accomplished for example by not varying from the procedures used to produce each of the multiple "weakly scattering states" and by not varying from the procedures used to produce each of the multiple "strongly scattering states");
(b) where during repeated switching between the "strongly scattering state" and the "weakly scattering state," the liquid crystal domain size range of the multiple "weakly scattering states" may differ (this embodiment may be accomplished by using for example different electric field strengths among the multiple "weakly scattering states"); and
(c) where during repeated switching between the "strongly scattering state" and the "weakly scattering state," the liquid crystal domain size range of the multiple "strongly scattering states" may differ (this embodiment may be accomplished by using for example different electric field strengths among the multiple "strongly scattering states").

The number of liquid crystal domains can be for example in the hundreds, thousands, tens of thousands, or millions with a range of domain sizes. In embodiments, a number of the liquid crystal domains such as for example about 70% to 100% of the liquid crystal domains may change in size when switching occurs. However, in embodiments, some of the liquid crystal domains will remain unchanged in size when switching occurs.

In embodiments where the device is a display device, the extent of light reflectance by the display device may be determined by reflectance spectrophotometry measured for instance for the whole visible spectrum (380 nm to 730 nm). Gretag spectrophotometer at normal angle with respect to the device surface may be used in order to measure the reflectance of the inventive devices, such light reflectance measurement procedures being well known to those skilled in the art.

The present device defines spaces for the liquid crystal compositions. Each space has a thickness ranging for example from about 5 micrometers to about 50 micrometers. In embodiments, the predetermined light enters the spaces (and the liquid crystal composition) at an orthogonal angle or any other appropriate angle.

A portion of the device may be substantially transparent to the predetermined light to allow the predetermined light to reach the liquid crystal compositions. The phrase "substantially transparent" encompasses one or more substantially transparent substrates and/or one or more openings. In addition, the phrase "substantially transparent" refers to, in embodiments, the transmission of about 60% to 100% of the predetermined light that enters the substantially transparent portion of the device; light transmission values outside this exemplary range are encompassed where such light transmission values enable the present device to function as for example a display device, an optical digital storage device, an optical switching device, or some other photonic device.

In embodiments, the device also includes a colored (that is, non-white) surface positioned to absorb a portion of the predetermined light that passes through the liquid crystal compositions in the weakly scattering state where the liquid crystal compositions may be disposed between substantially transparent substrates of the device and the colored surface. The extent of light absorption by the colored surface may be such that an observer sees the predetermined color (black, gray, red, green, or any other desired color) when looking through the substantially transparent substrates of the device and the liquid crystal compositions at the colored surface. The colored surface may be for example a painted layer or a separate colored layer. The colored surface (whether a painted layer or a separate colored layer) needs to be thick enough so that it is not transparent to the incident light, i.e., a viewer does not see anything through a device after painting or placing the colored layer. A separate colored layer may be for example fabricated from colored glass, colored paper or colored plastic. The colored layer may be attached to or held in place to the structure via for example an adhesive or a clamp In embodiments, a portion of the device is substantially transparent to the predetermined light to allow entry of the predetermined light into the device, through the liquid crystal compositions, and exit of the predetermined light from the device in the weakly scattering state.

In embodiments, the device includes three or more flat substrates that are sealed around their edges and separated by spacers to define the space for the various liquid crystal compositions. The substrates may be transparent, fabricated from for example glass or plastic materials. The internal sides of the transparent substrates are coated with a conductive electrode layer, which constitute the electrodes required to apply different electric fields in order to switch the device to different states. In embodiments, the conductive electrode layers are substantially transparent with a thickness ranging for example from about 50 nanometers to about 1,000 nanometers. Typical materials for transparent electrodes include indium-tin oxide and the like, where the transparent electrodes have a resistivity of for example less than or equal to about 125 ohm/sq. Spacers used to control the thickness of the spaces for the liquid crystal compositions may be glass fibers or polymeric fibers or spheres. Fabrication of the device may be accomplished by first dispensing glue on the edges of one of the substrates, placing the second substrate on top, followed by curing to harden the glue, to result in a first "cell" of the device. A second "cell" is created by adding a third substrate using similar procedures. The glue can be either UV photo-curable like for example Norland Optical Adhesives or thermo-curable like for example epoxy glues. A small opening is left unsealed for each "cell," which is used for vacuum filling of the liquid crystal composition. Complete sealing of each cell can be accomplished with a thermally curable epoxy glue. In the case of a device containing monomers for a "macromolecule" liquid crystal domain stabilizing compound, polymerization of such monomers to obtain the "macromolecule" liquid crystal domain stabilizing compound is obtained by exposure to light or by heating (in the case of thermal initiation).

Sealing not only provides structural stability to each cell but also may prevent air leakage into each cell except at the opening and this enables air-filling.

Where the present device is used for example as a white and black display, an observer sees white as the color produced by device in the strongly scattering state where the predetermined light is in the visible spectrum.

As used herein, "white state" and "black state" refer to the perceived color of the reflected ambient light from the various liquid crystal compositions in the strongly scattering state composed of the smaller liquid crystal domains (for the "white state") and from the various liquid crystal compositions in the weakly scattering state composed of the larger liquid crystal domains (for the "black state" where the colored surface in the device is black).

As used herein, the "transparent state" refers to the various liquid crystal compositions in the weakly scattering state composed of the larger liquid crystal domains which is referred as "black state" when the colored surface is black.

In embodiments, the device may optionally include one or more mirrors and/or one or more fiber optic wires (external to the device or incorporated into the device) to facilitate the transmission of the predetermined light within the device.

A light source (external to the present device or incorporated into the device) may generate the predetermined light. Any suitable light wavelength or wavelengths may be employed such as those wavelengths useful for a display device, an optical digital storage device, an optical switching device, or some other photonic device. The suitable wavelength or wavelengths may be in any part of the spectrum such as the visible spectrum ranging for example from about 380 nm to about 730 nm, and the infrared spectrum ranging for example from about 730 nm to about 2000 nm, particularly from about 800 nm to about 1700 nm. The light source may be for example a laser, a light bulb, or sunlight. In the context of an optical switching device, the "predetermined light" refers to the wavelength(s) of the light which is turned ON or turned OFF by the optical switch device. When the device is used as a display, the "predetermined light" is ambient visible light.

For each liquid crystal composition, to change either the initial state (i.e., prior to the application of any electric field to the liquid crystal composition) or the weakly scattering state to the strongly scattering state, the electric field generating apparatus produces for instance a first electric field of sufficient strength to form an unstable state of a single liquid crystal domain (that is, no separate liquid crystal domains are visually observed). The first electric field can be a value ranging for example from about 2 V/μm to about 10

V/μm, particularly from about 3 V/μm to about 7 V/μm. The first electric field is applied for a time ranging for example from about 1 msec to about 1 sec, particularly from about 10 msec to about 100 msec. The first electric field is then reduced to a strongly scattering state inducing level to yield the strongly scattering state. The liquid crystal domains spontaneously arrange into the strongly scattering state at the strongly scattering state inducing level. The strongly scattering state inducing level corresponds to an electric field ranging for example from 0% to about 30% of the first electric field, particularly from 0 to about 10% of the first electric field. For instance, the strongly scattering state inducing level corresponds to an electric field ranging from 0% to about 5% of the first electric field, particularly 0%. The strongly scattering state inducing level is applied for a time ranging for example from about 10 msec to about 1 sec, particularly from about 10 msec to about 100 msec.

For each liquid crystal composition, to change either the initial state (i.e., prior to the application of any electric field to the liquid crystal composition) or the strongly scattering state to the weakly scattering state, the electric field generating apparatus produces for instance a second electric field weaker than the first electric field but stronger than the strongly scattering state inducing level. The second electric field is greater than the strongly scattering state inducing level by a value ranging for example from about 30% to about 70%, particularly from about 40% to about 60% of the difference between the first electric field and the strongly scattering state inducing level. For instance, the second electric field may be from about 0.5 V/μm to about 4 V/μm, particularly from about 0.75 V/μm to about 3 V/μm. The second electric field is applied for a time ranging for example from about 10 msec to about 1 sec, particularly from about 20 msec to about 200 msec.

In embodiments, for each liquid crystal composition, the switching between the weakly scattering state and the strongly scattering state may be accomplished without any significant degradation of the device for any desired number of times such as for example hundreds, thousands, millions of times or higher.

In embodiments, in the initial state just after device fabrication but before application of any electric field, the liquid crystal compositions may be mostly in a planar state, i.e., helices aligned perpendicularly to the surfaces of the substrates used to define the space for the liquid crystal composition. A few focal-conic domains of large size coexist with the planar state (that is, the liquid crystal composition in the initial state may be considered a single liquid crystal domain with a few "imperfections"). This initial state is suitable for measuring the reflected wavelength of the liquid crystal helices, which is an indirect measurement of the helical pitch of the liquid crystal. This initial state may be used in order to optimize the helical pitch of the liquid crystal. In fact, in the initial state, the liquid crystal compositions may be transparent to all wavelengths except to the wavelength corresponding to the helical pitch of the liquid crystal. In embodiments, after applying the first or the second electric field as described in this invention, the liquid crystal compositions may never return to this initial state.

In embodiments, the strongly scattering state and/or the weakly scattering state may be stable. The term "stable" refers to the fact that each of these states is capable of maintaining its characteristics as strongly scattering or weakly scattering for a period of time after the applied electric field is turned off. The term "stable" also may be to describe a "white state" and a "black state" which refers to the fact that each of these states is capable of maintaining its color for a period of time after the applied electric field is turned off, where the perceived color (white/black) is of the reflected light from the strongly scattering state (for the white state) and from the weakly scattering state (for the black state where the colored surface in the device is black). Within the time frame for "stable," some "decay" may occur over time such as a change in the liquid crystal domain size range but such a change in embodiments should not change a strongly scattering state to a weakly scattering state or a weakly scattering state to a strongly scattering state. The length of time that the strongly scattering state and the weakly scattering state are "stable" depends on a number of factors such as the type of liquid crystal, the type and concentration of the liquid crystal domain stabilizing compound, and the like. In embodiments, the length of time that the strongly scattering state and the weakly scattering state are "stable" after the applied electric field is turned off is sufficient for the device to function as any type of photonic device such as a display device, an optical switching device, an optical digital storage device, and the like, such a "stable" time period lasting for example from at least about 10 seconds and up such as minutes, perhaps hours, days, or even longer, particularly from about 10 seconds to about 20 minutes. For example, for a display device, the term "stable" means a long enough time so that a document written by applying a number of electric fields can be read when the power is turned off. In other words, the display maintains the written image for a long enough time to be readable at zero voltage. For example, the image is stable for a minimum of about 10 seconds. Some little decay may occur within the specified time, but this does not affect significantly the image, which is still perfectly readable. In an optical switching device, the term "stable" means the strongly scattering state and the weakly scattering state are capable of persisting until the next generation of an electric field to perform the switching.

Bistability allows fabrication of low power consuming devices, which are suitable for design of integrated optics circuits. Still, another important use of bistable devices is in optical digital storage, since after writing, the information is stable and can be read with a probe beam.

The term "unstable" when referring to the unstable state of the single liquid crystal domain produced by the first electric field means that this state immediately changes when the applied electric field is turned off or when the applied electric field is significantly lowered, for example, by at least about 50%. Immediately means less than about 0.5 seconds. In other words, this state is lost so fast so that an observer may not detect it after the applied electric field is turned off. In embodiments of the present invention, this unstable state produced by the first electric field may have the following characteristics: (a) a single liquid crystal domain (with no "imperfections"); (b) a homotropic state having an ordered structure with no liquid crystal helices; (c) liquid crystal molecules are perpendicular to the surfaces defining the space for the liquid crystal composition; and (d) transparent to all light wavelengths.

FIGS. 1-4 depict an embodiment of the present device useful as a display device 2A, particularly for example a white and black display. The device is composed of two liquid crystal cells (4A, 5A). The first liquid crystal cell 4A is composed of a top transparent flat substrate 8A and an intermediate transparent flat substrate 10A wherein the two flat substrates are sealed around their edges and are separated by spacers (not shown) to define a space 6A for the liquid crystal composition 14A. The internal side of the top substrate is coated with a transparent conductive electrode layer 28A and the side of the intermediate substrate facing liquid crystal composition 14A is coated with a transparent conductive electrode layer 30A to provide the electrodes needed to apply the electric field for switching. The second liquid crystal cell 5A is composed of intermediate transparent flat substrate 10A and a bottom transparent flat substrate 36A wherein the two flat substrates are sealed around their edges and are separated by spacers (not shown) to define a space 7A for the liquid crystal composition 15A. The side of the intermediate substrate facing liquid crystal composition 15A is coated with a transparent conductive electrode layer 32A and the internal side of the bottom substrate is coated with a transparent conductive electrode layer 34A to provide the electrodes needed to apply the electric field for switching. The external side of bottom substrate 36A includes a colored surface 12. Driver circuitry 16A is coupled to the electrodes of the two cells (4A, 5A), where the electrodes of the two cells are connected in parallel. The driver circuitry 16A is operatively coupled to a power source (not shown).

Figure 2:
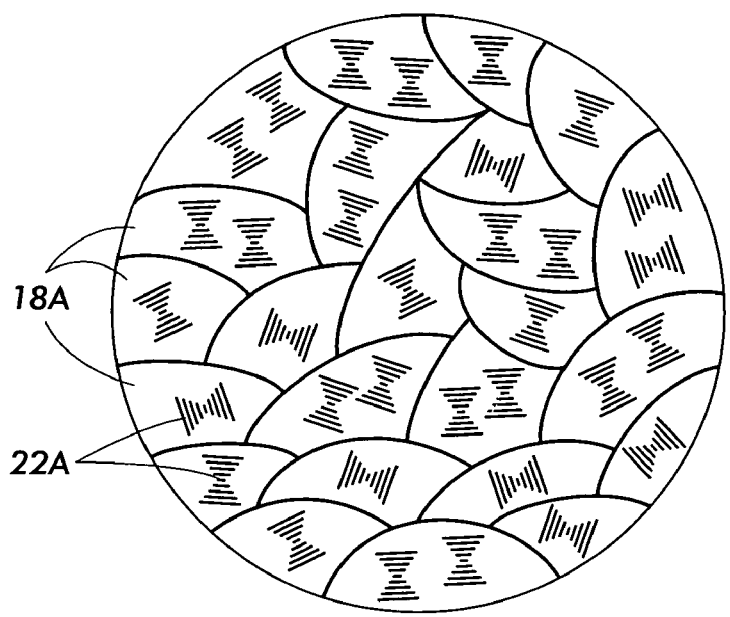
FIG. 2 depicts a simplified magnified view of a portion of the device of FIG. 1.

FIGS. 1-2 illustrate the strongly scattering state in the two liquid crystal compositions (14A, 15A) where the predetermined light 24A is scattered by the plurality of smaller liquid crystal domains 18A. To an observer looking in the direction of the colored surface 12, the colored surface appears white (where the predetermined light is in the visible spectrum). FIG. 2 depicts a magnified view of the liquid crystal compositions in the strongly scattering state of a plurality of smaller liquid crystal domains 18A, where the smaller domains are in a random orientation. The orientation of the smaller liquid crystal domains is the orientation of the helices 22A inside the domains.

Figure 3:
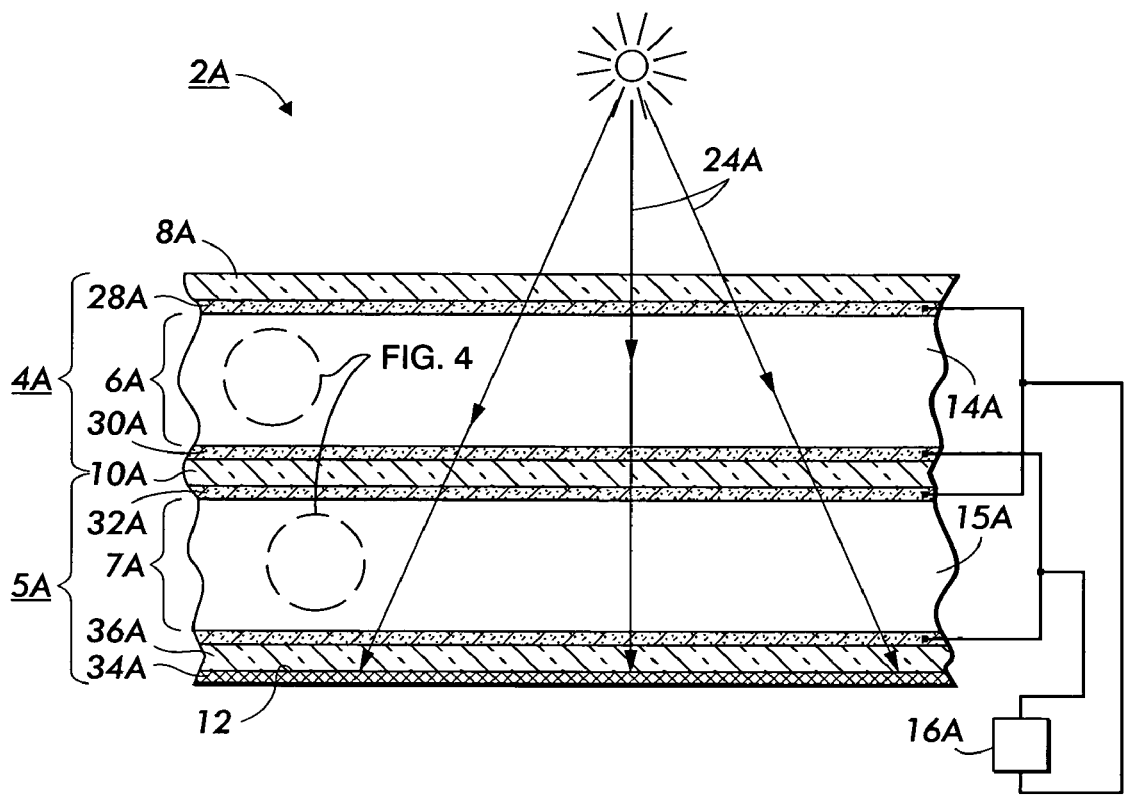
FIG. 3 depicts an elevational simplified view of the first embodiment of the present device where the device exhibits a weakly scattering state.
Figure 4:
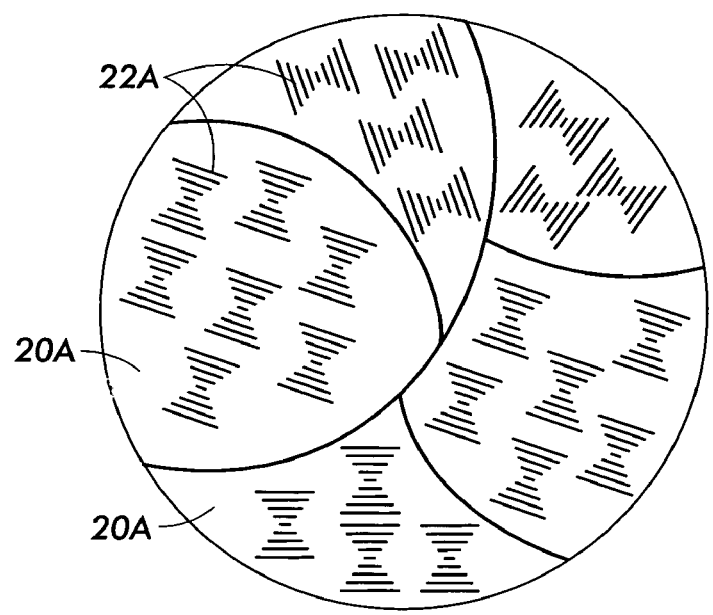
FIG. 4 depicts a simplified magnified view of a portion of the device of FIG. 3.

FIGS. 3-4 illustrate the weakly scattering state of a plurality of larger liquid crystal domains in the two liquid crystal compositions (14A, 15A) where the predetermined light 24A passes through the two cells (4A, 5A) to the colored surface 12 where the predetermined light is weakly scattered by the plurality of the larger liquid crystal domains 20A. The colored surface 12 absorbs a portion of the predetermined light. To an observer looking in the direction of the colored surface, the colored surface has the color of the colored surface (where the predetermined light is in the visible spectrum). FIG. 4 depicts a magnified view of the liquid crystal compositions (14A, 15A) in the weakly scattering state of a plurality of larger liquid crystal domains 20A where the larger domains are in a random orientation. The orientation of the larger liquid crystal domains is the orientation of the helices 22A inside the domains.

FIGS. 1-4 show schematically a multilayer display where for clarity only a single pixel is shown. The present device may have any suitable number of pixels. A working display capable of showing images or text is made of patterned electrodes. The electrodes (e.g., 28A, 30A, 32A, 34A) are made of multiple spaced apart conductive electrodes, i.e., pixels or lines, which are individually addressed by the driver circuitry electronics.

Fabrication of arrays of patterned electrodes is known in prior art, especially in the case of substrates having electrodes only on one side. In fabricating the present device, the electrode patterning occurs prior to the assemblying together of the two liquid crystal cells (4A, 5A). Electrodes 30A and 32A are present on the intermediate substrate 10A, which has the electrodes on both sides. Photolithographic procedures for patterning substrates having electrodes on both sides are known. For example, Khan et al., U.S. Pat. No. 6,654,080 B1, the disclosure of which is totally incorporated herein by reference, describes a procedure for producing conductive pixels on both sides of a substrate. This procedure uses a photoresist which is spin-coated successively on both sides of the substrate having conductive electrodes on both sides. The coated substrate is then exposed to UV light through a mask in order to create the desired pattern on the electrodes, on both sides of the substrate. The advantage of this procedure is that it produces the electrode pattern on both sides of the substrate. However, because two layers of photoresist need to be exposed to UV light, the dose of UV light is two to four times higher than in the case of photolithography of a single layer of photoresist.

Another suitable procedure for patterning substrates having electrodes on both sides, as for the substrate 10A, uses two different photoresists having different absorption properties in the UV range. For example, the electrode 30A is coated with a first photoresist having high sensitivity at a first UV wavelength for example at 365 nm, but it has reduced absorption at wavelengths higher then the first UV light. The electrode 32A on the other side is coated with a second photoresist which is sensitive to a second UV wavelength which is different from the first said UV light, for example at 400 nm. The second UV wavelength could be higher or smaller when compared with the first UV wavelength. A photolithographic technique works as follows: The top electrode 30A is coated with a first photoresist which is sensitive to 365 nm wavelength for example, but has little or no sensitivity at 400 nm UV light, for example. The bottom electrode 32A is coated with a second photoresist which is sensitive to UV light at 400 nm. The double sided coated substrate/electrode assembly is then exposed to the UV light through a mask, having the first photoresist on top. The sample is exposed to 365 nm UV light which produces photolithographically drawn patterns on the top electrode 30A. The intensity of the light is the same as used in photolithography of substrates coated only on one side. In a second step, the substrate and mask assembly are exposed to a second UV light, for example of 400 nm, without moving or removing the mask or turning the substrate upside down. The light of 400 nm passes through the first photoresist and does the photolithography on the bottom electrode 32A.

In a simplified procedure, the double sided substrate 10A coated with photoresist can be exposed in a single step to a broad-band UV light containing both of the above mentioned UV wavelengths. This procedure can produce in a single or double exposure the same electrode pattern on both sides of the substrate and it does not require significantly increased intensity or dose of the UV light as it is the case with the technique described in U.S. Pat. No. 6,654,080 B1.

With both procedures, after the exposure step, the photoresist pattern is developed, baked and then placed in an acid bath to etch the unwanted regions of ITO and produce the electrode pattern on both sides of the substrate 10A.

FIGS. 5-8 depict an embodiment of the present device useful as an optical switching device 2B between two optical fibers (not shown) where a light signal can be transmitted or not from one optical fiber to the next optical fiber in a controlled manner. The device is composed of two liquid crystal cells (4B, 5B). The first liquid crystal cell 4B is composed of a top transparent flat substrate 8B and an intermediate transparent flat substrate 10B wherein the two flat substrates are sealed around their edges and are separated by spacers (not shown) to define a space 6B for the liquid crystal composition 14B. The internal side of the top substrate is coated with a transparent conductive electrode layer 28B and the side of the intermediate substrate facing liquid crystal composition 14B is coated with a transparent conductive electrode layer 30B to provide the electrodes needed to apply the electric field for switching. The second liquid crystal cell 5B is composed of intermediate transparent flat substrate 10B and a bottom transparent flat substrate 36B wherein the two flat substrates are sealed around their edges and are separated by spacers (not shown) to define a space 7B for the liquid crystal composition 15B. The side of the intermediate substrate facing liquid crystal composition 15B is coated with a transparent conductive electrode layer 32B and the internal side of the bottom substrate is coated with a transparent conductive electrode layer 34B to provide the electrodes needed to apply the electric field for switching. Driver circuitry 16B is coupled to the electrodes of the two cells (4B, 5B), where the electrodes of the two cells are connected in parallel. The driver circuitry 16B is operatively coupled to a power source (not shown). The device 2B includes a receiver 26 to receive any predetermined light that passes through the two cells (4B, 5B). The receiver 26 may be separate from or coupled to cell 5B. The receiver may for example amplify the light signal, act as a switch or act as a transducer converting the light signal into another signal type (e.g., sound, electrical impulse, mechanical and the like). The receiver 26 is commercially available from a number of vendors.

Figure 5:
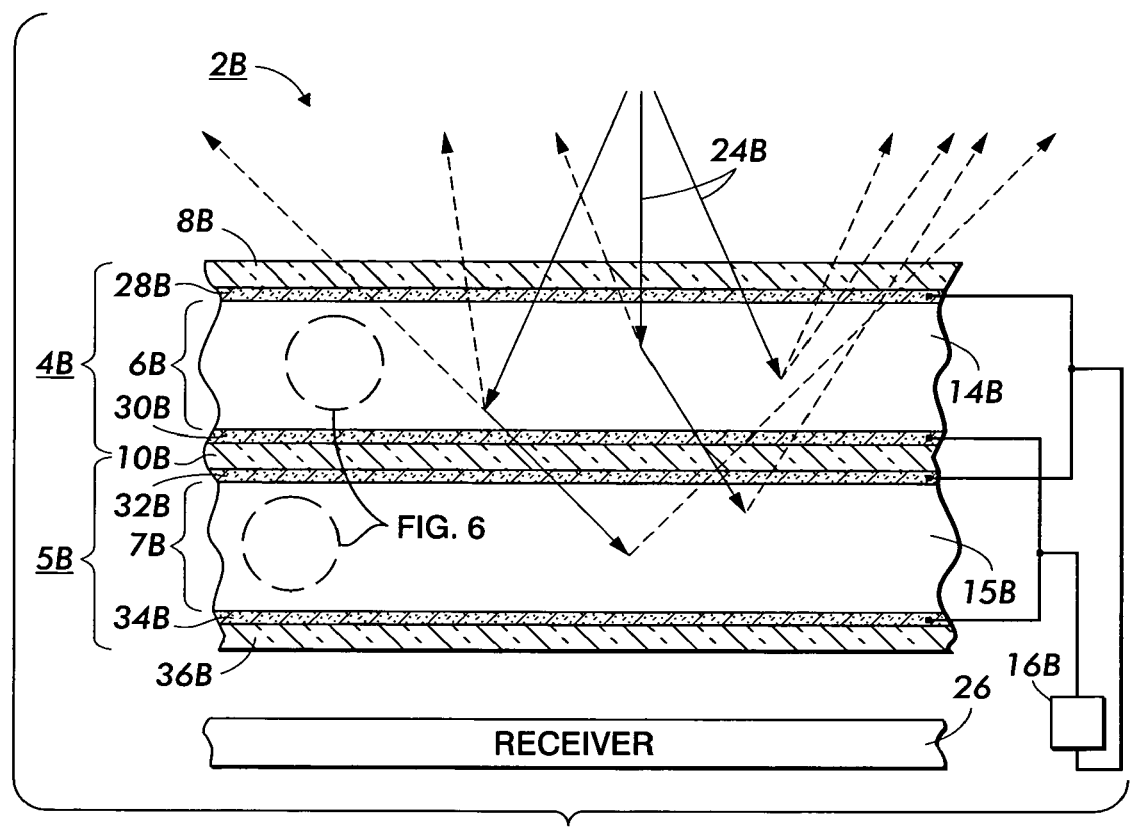
FIG. 5 depicts an elevational simplified view of a second embodiment of the present device where the device exhibits a strongly scattering state.
Figure 6:
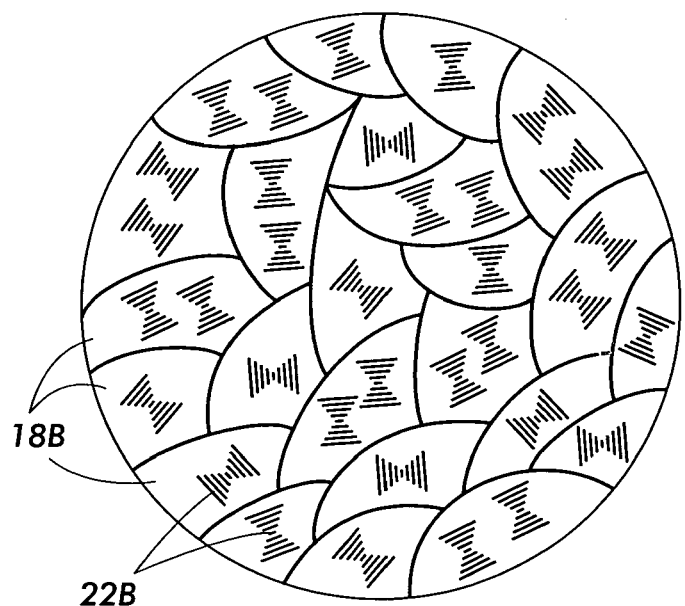
FIG. 6 depicts a simplified magnified view of a portion of the device of FIG. 5.

FIGS. 5-6 illustrate the strongly scattering state in the two liquid crystal compositions (14B, 15B) where the predetermined light 24B is scattered by the plurality of smaller liquid crystal domains and little if any of the predetermined light reaches the receiver 26. FIG. 6 depicts a magnified view of the liquid crystal compositions (14B, 15B) in the strongly scattering state of a plurality of smaller liquid crystal domains 18B. The orientation of the smaller liquid crystal domains is the orientation of the helices 22B inside the domains.

Figure 7:
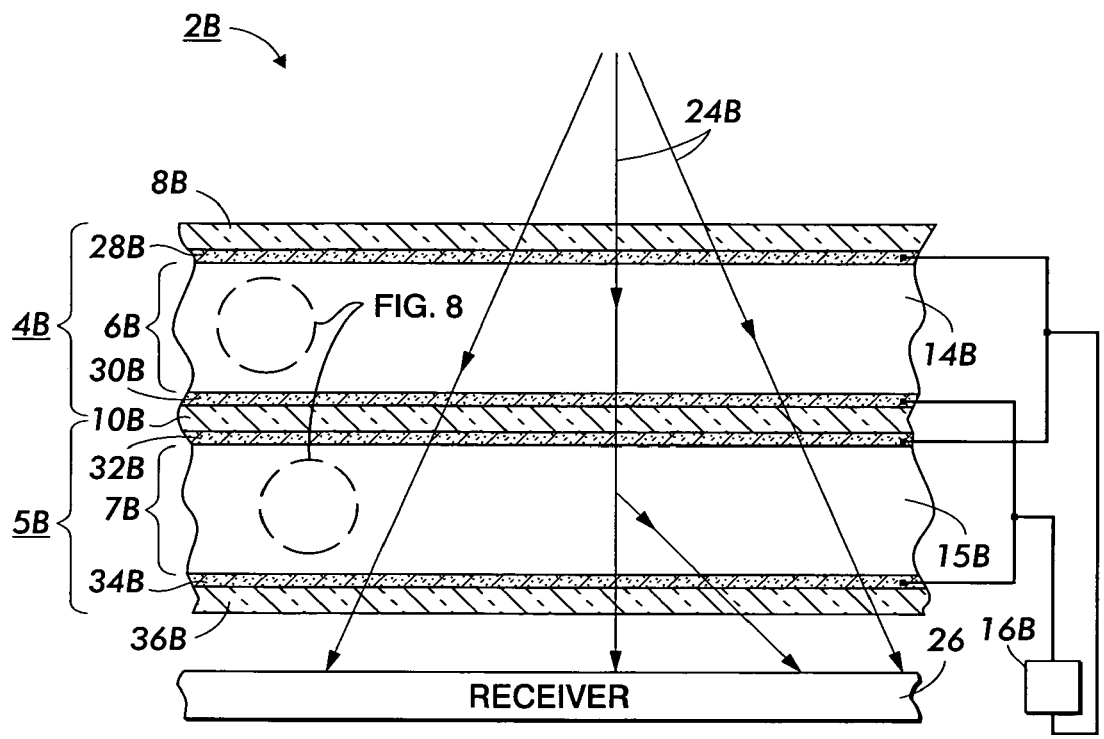
FIG. 7 depicts an elevational simplified view of the second embodiment of the present device where the device exhibits a weakly scattering state.
Figure 8:
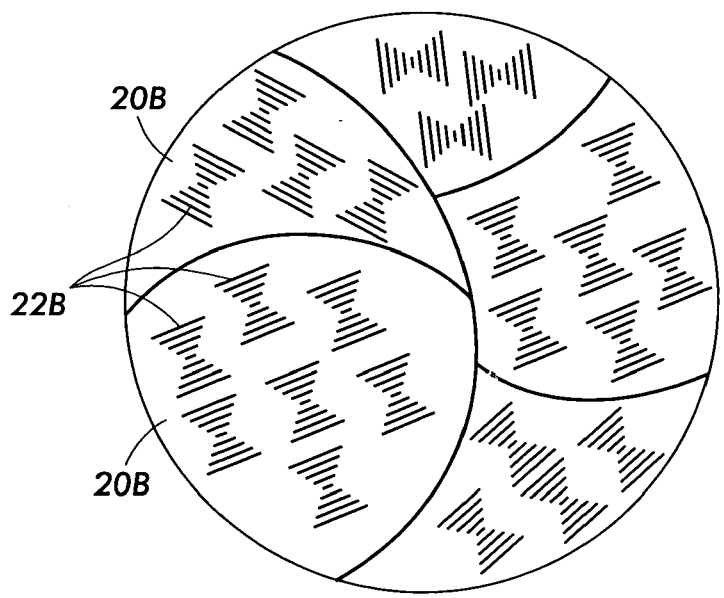
FIG. 8 depicts a simplified magnified view of a portion of the device of FIG. 7.

FIGS. 7-8 illustrate the weakly scattering state in the two liquid crystal compositions (14B, 15B) where the predetermined light 24B passes through the two cells (4B, 5B) to the receiver 26 (the predetermined light is weakly scattered by the plurality of the larger liquid crystal domains). FIG. 8 depicts a magnified view of the liquid crystal compositions (14B, 15B) in the weakly scattering state of a plurality of larger liquid crystal domains 20B. The orientation of the larger liquid crystal domains is the orientation of the helices 22B inside the domains.

FIGS. 1-8 depict embodiments of the present device where each liquid crystal composition is subjected to a separate electric field. In other embodiments, however, the device generates and controls a single electric field which acts on all the liquid crystal compositions. For example, the device depicted in FIG. 1-4 may be modified by omitting electrode 30A and electrode 32A and redoing the electrical connections such that driver circuitry 16A is operatively coupled to electrode 28A and electrode 34A where such a modified device generates and controls a single electric field on the two liquid crystal compositions.

The invention will now be described in detail with respect to specific exemplary embodiments thereof, it being understood that these examples are intended to be illustrative only and the invention is not intended to be limited to the materials, conditions, or process parameters recited herein.

In the examples below, the following guidelines are followed unless otherwise noted:
(1) All percentages and parts are by weight.
(2) The switching in the devices between the weakly scattering state and the strongly scattering state is accomplished at room temperature, i.e., about 25 degrees C.
(3) All the liquid crystal cells were prepared and filled in the same manner as described in Example 1.
(4) Cholesteric liquid crystals sold under the "BL" series designation such as BL118 and BL087 are available from EM Industries, Inc.

EXAMPLE 1

Preparation of a Device Containing Small Molecule Liquid Crystal Stabilizing Compound (One Liquid Crystal Cell)

There was prepared a liquid crystal composition that included the following:
300 mg of BL118 (cholesteric liquid crystal reflecting at about 580 nm);
200 mg of BL087 (nematic liquid crystal, used to adjust the helical pitch); and
50 mg 4-NC—$C_6H_4$—N(n-$C_{10}H_{21}$)$_2$ (small molecule liquid crystal stabilizing compound).

The liquid crystal composition was homogenized by heating at about 110° C. and by shaking, then allowed to cool down to room temperature. An empty 25 micrometer thick liquid crystal containment structure was fabricated by sealing two indium tin oxide ("ITO") (transparent electrodes) glass coated slides. A small hole is kept in the sealing to be used for filling the liquid crystal composition. The containment structure was vacuum filled with the above liquid crystal composition, pressed and sealed. Immediately after preparation and before filling, the liquid crystal composition was in an essentially planar state (quasi-planar), which was used to measure the reflected wavelength of the prepared liquid crystal composition (which is an indirect measure of the helical pitch). The reflected wavelength was 960 nm. After the first switching, the liquid crystal composition never reached again the quasi-planar state, but was always in focal-conic states. The liquid crystal composition changed to a homeotropic state when a voltage of about 80 Vrms was applied (sine wave, 60 Hz). When the voltage was turned off, the liquid crystal composition went to the white state (focal-conic; small domains). When a voltage of 40-50 Vrms was applied, the liquid crystal composition switched to the transparent state (focal-conic; large domains). When the voltage was turned off, the liquid crystal composition maintained the transparent state. Reflectance measurements were performed with the device having a black background. White reflectance was 11% and black reflectance was 1.6%. Contrast ratio was 7/1. Both white and black states were stable for at least 4 days.

EXAMPLE 2

Preparation of a Device Containing a Macromolecular Liquid Crystal Stabilizing Compound (One Liquid Crystal Cell)

There was prepared a liquid crystal composition that included the following:
96.5% liquid crystal mixture (BL118/BL087=65/35);
3% $CH_2$=CH—COO—$(CH_2)_6$—O—$C_6H_4$—CN (polymerizable monomer); and
0.5% camphoroquinone.

The liquid crystal composition was homogenized by light heating (to prevent polymerization initiation) and shaking. The composition was prepared under yellow light, again in order to prevent polymerization initiation. A 25 micrometer liquid crystal containment structure was prepared and filled with this composition using the procedures described in other examples, pressed and fully sealed. Then it was exposed to visible light (470 nm from a Xenon lamp, and by using appropriate optical band-pass filter) for at least 30 min. The device was placed over a black background tested for switching. It switched white when 100 V DC were applied then suddenly turned off the voltage. The white reflectivity was 19%. It switched transparent (black because of the black background) when 50-60 V DC was applied. It maintained the black state when the voltage was turned off. The contrast ratio was 7.5/1. The black state is stable (does not decay for at least 2 weeks). The white state maintained a good white reflectance for about 15 min. After this time, the device required refreshing in order to maintain a good white reflectance.

EXAMPLE 3

Preparation of a Device Containing a Dispersant

There was prepared a liquid crystal composition including the following:
95.5% liquid crystal mixture (BL118/BL087=60/40);
3% $CH_2=CH-COO-(CH_2)_6-O-C_6H_4-CN$ (polymerizable monomer);
0.5% camphoroquinone; and
1% sorbitan trioleate (SPAN 85; dispersant, commercially available at Sigma-Aldrich).

A 25 micrometer liquid crystal containment structure containing the liquid crystal composition was prepared by shaking the liquid crystal composition and by slight heating (<60° C.) and filled with the liquid crystal composition using the procedures as described in other examples. The containment structure was exposed to 470 nm wavelength light for 1 hour. The device showed 17% white reflectivity, and a contrast ratio of 7/1. A high voltage of about 100 V DC was used. After turning off the high voltage, the liquid crystal composition was in the white state. A week after, the white reflectance was 14%. For comparison, a device made without dispersant as shown in EXAMPLE 2 had only 8% white reflectance a week after turning off the voltage.

EXAMPLE 4

Preparation of a Device Using a Non-Dipolar Co-Monomer

There was prepared a liquid crystal composition including the following:
96% liquid crystal mixture (BL118/BL087=60/40);
3% $CH_2=CH-COO-(CH_2)_6-O-C_6H_4-CN$ (polymerizable monomer);
0.5% camphoroquinone; and
0.5% SR9003 (propoxylated neopentyl glycol diacrylate; non-dipolar co-monomer, commercially available).

The liquid crystal composition was homogenized as described in Example 2. Then a 25 micrometer liquid crystal containment structure was prepared and filled with the liquid crystal composition using the procedures described in other examples and exposed to visible light (470 nm) for 1 hour. The device switched homeotropic at 100 V DC, then white when the voltage was turned off. It switched transparent (black on a black background) when 50-60 V DC or AC was applied. Both white and black states were stable immediately after turning off the voltage, but the white started to decay as described in Example 2. The transparent state was very uniform with no whitish spots. In contrast, some whitish spots were visible in the transparent state when a comparison device was prepared using the same procedures except that no co-monomer was used.

EXAMPLE 5

Preparation of a Device Containing both Dispersant and Non-Dipolar Co-Monomer

There was prepared a liquid crystal composition which included the following:
96% liquid crystal mixture (BL118/BL087=65/35);
3% $CH_2=CH-COO-(CH_2)_6-O-C_6H_4-CN$ (polymerizable monomer);
0.5% camphoroquinone;
0.5% SR9003 (non-dipolar co-monomer, commercially available); and
1% SPAN 85 (dispersant).

The liquid crystal composition was homogenized as described in Example 2. A liquid crystal containment structure was prepared and filled with the liquid crystal composition using the procedures described in other examples. After sealing, the liquid crystal composition is exposed for 1 hour to 470 nm wavelength light. The device switches at about 100 V to achieve stable white state when the voltage is turned off. The device switches to a transparent state when a voltage of 50-70 V is applied. This state is uniformly transparent and stable after the voltage is turned off.

EXAMPLE 6

Procedures similar to Example 1 were used to prepare two devices. The first device was a single liquid crystal cell which contained a layer of a liquid crystal composition. The second device was composed of two liquid crystal cells in a stacked arrangement, wherein each cell contained a layer of a liquid crystal composition. The liquid crystal compositions in the two devices contained the following: 300 mg of BL118 (cholesteric liquid crystal reflecting at about 580 nm); 200 mg of BL087 (nematic liquid crystal, used to adjust the helical pitch); and 50 mg $4-NC-C_6H_4-N(n-C_{10}H_{21})_2$ (small molecule liquid crystal stabilizing compound). The optical densities ("OD") of the two devices were measured for clear state (background painted black; also referred to in this example as "black state") and the white state.

|  | OD white state | OD black state | ΔOD |
|---|---|---|---|
| Two cell device | 0.85 | 1.56 | 0.71 |
| One cell device | 1.01 | 1.74 | 0.73 |

The optical density of the white state was improved from 1.01 (one cell device) to 0.85 for the device having two liquid crystal cells. The optical contrast remained about the same (about 0.7) for the two devices.

We claim:

1. A device comprising:
(a) a first liquid crystal composition including a first liquid crystal and a first liquid crystal domain stabilizing compound, wherein the first liquid crystal composition switches between a strongly scattering state of a first plurality of smaller liquid crystal domains that strongly scatters a predetermined light and a weakly scattering state of a second plurality of larger liquid crystal domains that weakly scatters the predetermined light; and
(b) a second liquid crystal composition including a second liquid crystal and a second liquid crystal domain stabilizing compound, wherein the second liquid crystal composition switches between a strongly scattering state of a first plurality of smaller liquid crystal domains that strongly scatters the predetermined light and a weakly scattering state of a second plurality of larger liquid crystal domains that weakly scatters the predetermined light, wherein the second liquid crystal composition and the first liquid crystal composition are in a stacked arrangement.

2. The device of claim 1, further comprising driver circuitry for controlling the switching between the strongly scattering state and the weakly scattering state in the first liquid crystal composition and in the second liquid crystal composition, wherein the driver circuitry synchronizes the switching so that the first liquid crystal composition and the second liquid crystal composition switches substantially simultaneously to the same scattering state.

3. The device of claim 1, wherein the first liquid crystal composition is subjected to a first electric field and the second liquid crystal composition is subjected to a separate second electric field.

4. The device of claim 1, wherein the first liquid crystal composition and the second liquid crystal composition have the same composition.

5. The device of claim 1, wherein the first liquid crystal composition and the second liquid crystal composition have different compositions.

6. The device of claim 1, wherein both the weakly scattering and the strongly scattering state are stable for the first liquid crystal composition and for the second liquid crystal composition.

7. The device of claim 1, wherein the first liquid crystal and the second liquid crystal in both the smaller liquid crystal domains and the larger liquid crystal domains possess helical axes that are randomly oriented.

8. The device of claim 1, further comprising a black surface and the device is capable of displaying a white state and a black state.

9. The device of claim 1, further including a colored surface positioned to absorb a portion of the predetermined light that passes through the first liquid crystal composition in the weakly scattering state and through the second liquid crystal composition in the weakly scattering state such that an observer sees a predetermined color.

10. The device of claim 1, further including a receiver.

11. The device of claim 1, wherein a portion of the device is substantially transparent to the predetermined light to allow entry of the predetermined light into the device, through the first liquid crystal composition and the second liquid crystal composition, and exit of the predetermined light from the device in the weakly scattering state of the first liquid crystal composition and of the second liquid crystal composition.

12. The device of claim 1, wherein the first liquid crystal domain stabilizing compound and the second liquid crystal domain stabilizing compound are a same or different small molecule liquid crystal domain stabilizing compound, and wherein the first liquid crystal composition and the second liquid crystal composition further includes a same or different macromolecule liquid crystal domain stabilizing compound.

13. The device of claim 1, wherein the first liquid crystal domain stabilizing compound and the second liquid crystal domain stabilizing compound are the same or different, both of formula (1)

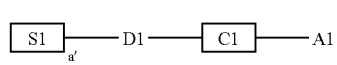

(1)

wherein:
A1 is an electron acceptor moiety;
C1 is a conjugated bridging moiety;
D1 is an electron donor moiety;
S1 is a liquid crystal compatibilizing moiety; and
a' is an integer.

14. The device of claim 1, wherein the first liquid crystal domain stabilizing compound and the second liquid crystal domain stabilizing compound are the same or different, both of formula (3)

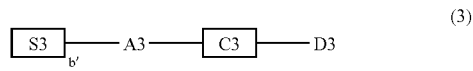

(3)

wherein:
D3 is an electron donor moiety;
C3 is a conjugated bridging moiety;
A3 is an electron acceptor moiety;
S3 is a liquid crystal compatibilizing moiety; and
b' is an integer.

15. The device of claim 1, wherein the first liquid crystal domain stabilizing compound and the second liquid crystal domain stabilizing compound are the same or different, both of formula (4)

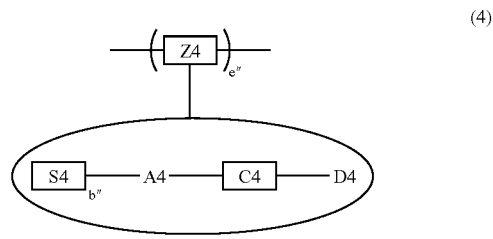

(4)

wherein:
D4 is an electron donor moiety;
C4 is a conjugated bridging moiety;
A4 is an electron acceptor moiety;
S4 is a liquid crystal compatibilizing moiety;
b" is an integer;
Z4 is a polymerizable moiety; and
e" is the degree of polymerization.

16. The device of claim 1, wherein the first liquid crystal domain stabilizing compound and the second liquid crystal domain stabilizing compound are the same or different, both of formula (5)

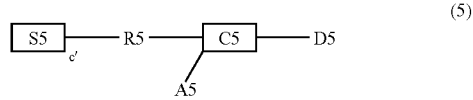

(5)

wherein:
D5 is an electron donor moiety;
C5 is a conjugated bridging moiety;
A5 is an electron acceptor moiety;
R5 is a spacer moiety;
S5 is a liquid crystal compatibilizing moiety; and
c' is an integer.

17. The device of claim 1, wherein the first liquid crystal domain stabilizing compound and the second liquid crystal domain stabilizing compound are the same or different, both of formula (6)

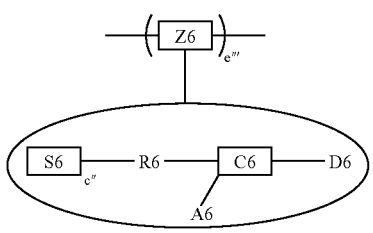

(6)

wherein:
D6 is an electron donor moiety;
C6 is a conjugated bridging moiety;
A6 is an electron acceptor moiety;
R6 is a spacer moiety;
S6 is a liquid crystal compatibilizing moiety;
$c''$ is an integer;
Z6 is a polymerizable moiety; and
$e'''$ is the degree of polymerization.

18. A method comprising:
(a) providing a first liquid crystal composition including a first liquid crystal and a first liquid crystal domain stabilizing compound, wherein the first liquid crystal composition is switchable between a strongly scattering state of a first plurality of smaller liquid crystal domains that strongly scatters a predetermined light and a weakly scattering state of a second plurality of larger liquid crystal domains that weakly scatters the predetermined light;
(b) providing a second liquid crystal composition including a second liquid crystal and a second liquid crystal domain stabilizing compound, wherein the second liquid crystal composition is switchable between a strongly scattering state of a first plurality of smaller liquid crystal domains that strongly scatters the predetermined light and a weakly scattering state of a second plurality of larger liquid crystal domains that weakly scatters the predetermined light, wherein the second liquid crystal composition and the first liquid crystal composition are in a stacked arrangement; and
(c) switching between the strongly scattering state and the weakly scattering state in the first liquid crystal composition and in the second liquid crystal composition.

19. The method of claim 18, wherein the switching is synchronized so that the first liquid crystal composition and the second liquid crystal composition switches substantially simultaneously to the same scattering state.

20. The method of claim 18, wherein the first liquid crystal composition and the second liquid crystal composition have the same composition.

21. The method of claim 18, wherein the first liquid crystal composition and the second liquid crystal composition have different compositions.

22. The method of claim 18, wherein both the weakly scattering and the strongly scattering state are stable for the first liquid crystal composition and for the second liquid crystal composition.

23. The method of claim 18, wherein the first liquid crystal and the second liquid crystal in both the smaller liquid crystal domains and the larger liquid crystal domains possess helical axes that are randomly oriented.

* * * * *